(12) United States Patent
Lipovetskaya et al.

(10) Patent No.: US 8,501,272 B2
(45) Date of Patent: Aug. 6, 2013

(54) HEMISPHERICAL COATING METHOD FOR MICRO-ELEMENTS

(75) Inventors: Yelena Lipovetskaya, Santa Barbara, CA (US); Brian Gobrogge, Grand Rapids, MI (US)

(73) Assignee: Cospheric LLC, Santa Barbara, CA (US)

( * ) Notice: Subject to any disclaimer, the term of this patent is extended or adjusted under 35 U.S.C. 154(b) by 1482 days.

(21) Appl. No.: 12/004,746

(22) Filed: Dec. 21, 2007

(65) Prior Publication Data

US 2012/0135138 A1   May 31, 2012

Related U.S. Application Data

(60) Provisional application No. 60/876,767, filed on Dec. 22, 2006.

(51) Int. Cl.
  *B05D 7/00* (2006.01)
  *B05D 5/06* (2006.01)
  *B05D 1/18* (2006.01)
  *G01N 1/28* (2006.01)

(52) U.S. Cl.
  USPC ............ 427/218; 427/2.11; 427/58; 427/287; 427/443.2

(58) Field of Classification Search
  USPC ............ 427/2.11, 58, 256, 287, 430.1, 443.2; 118/400, 406, 423
  See application file for complete search history.

(56) References Cited

U.S. PATENT DOCUMENTS

| 3,743,382 A | 7/1973 | Rosenberg |
| 4,126,854 A | 11/1978 | Sheridon |
| 4,143,103 A | 3/1979 | Sheridon |
| 4,261,653 A | 4/1981 | Goodrich |
| 4,438,160 A | 3/1984 | Ishikawa et al. |
| 4,810,431 A | 3/1989 | Leidner |

(Continued)

FOREIGN PATENT DOCUMENTS

| EP | 0 935 230 | 11/1999 |
| WO | WO02/29485 | 4/2002 |
| WO | WO2008/045891 | 4/2008 |
| WO | WO2008/080066 | 7/2008 |

OTHER PUBLICATIONS

US Office Action dated Jul. 9, 2010 issued in U.S. Appl. No. 12/790,590.

(Continued)

*Primary Examiner* — James Lin
(74) *Attorney, Agent, or Firm* — Weaver Austin Villeneuve & Sampson LLP

(57) ABSTRACT

Optically anisotropic spheres that can be used as pixel elements in rotating element displays are fabricated by partially (e.g., hemispherically) coating a plurality of spheres by transfer coating methods. Typically, a monolayer of spaced apart monochromal (e.g., white) spheres is formed on a support surface by, for example, making use of a removable template matrix. Next, a uniform layer of viscous coating material (e.g., black coating) is applied to the monolayer of spheres to transfer at least some of the coating material onto the surface of spheres in a monolayer. The obtained partially coated spheres are optionally cured by a UV or thermal exposure and are then removed from the support substrate. In some embodiments, coating material also provides electrical anisotropy to the spheres. Transfer coating methods result in improved precision of hemispherical coating and allow use of environmentally robust pixel elements.

49 Claims, 12 Drawing Sheets

U.S. PATENT DOCUMENTS

| | | | |
|---|---|---|---|
| 5,344,594 A | 9/1994 | Sheridon |
| 5,708,525 A | 1/1998 | Sheridon |
| 5,717,514 A | 2/1998 | Sheridon |
| 5,737,115 A | 4/1998 | Mackinlay et al. |
| 5,751,268 A | 5/1998 | Sheridon |
| 5,754,332 A | 5/1998 | Crowley |
| 5,760,761 A | 6/1998 | Sheridon |
| 5,767,826 A | 6/1998 | Sheridon et al. |
| 5,777,782 A | 7/1998 | Sheridon |
| 5,808,783 A | 9/1998 | Crowley |
| 5,815,306 A | 9/1998 | Sheridon et al. |
| 5,892,497 A | 4/1999 | Robertson |
| 5,914,805 A | 6/1999 | Crowley |
| 5,917,646 A | 6/1999 | Sheridon |
| 5,930,026 A | 7/1999 | Jacobson et al. |
| 5,982,346 A | 11/1999 | Sheridon et al. |
| 5,989,629 A | 11/1999 | Sacripante et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,072,276 A | 6/2000 | Okajima |
| 6,122,094 A | 9/2000 | Silverman |
| 6,162,321 A | 12/2000 | Silverman |
| 6,222,513 B1 | 4/2001 | Howard et al. |
| 6,379,856 B2 | 4/2002 | Sokol et al. |
| 6,428,868 B1 | 8/2002 | Sheridon et al. |
| 6,441,881 B1 | 8/2002 | Enomoto et al. |
| 6,441,946 B1 | 8/2002 | Sheridon |
| 6,445,490 B1 | 9/2002 | Chopra et al. |
| 6,459,200 B1 | 10/2002 | Moore |
| 6,462,859 B1 | 10/2002 | Bastiaens et al. |
| 6,487,002 B1 | 11/2002 | Biegelsen |
| 6,498,674 B1 | 12/2002 | Sheridon |
| 6,549,327 B2 | 4/2003 | Foucher |
| 6,577,432 B2 | 6/2003 | Engler et al. |
| 6,672,921 B1 | 1/2004 | Liang et al. |
| 6,693,620 B1 | 2/2004 | Herb et al. |
| 6,727,881 B1 | 4/2004 | Albert et al. |
| 6,750,844 B2 | 6/2004 | Nakanishi |
| 6,788,452 B2 | 9/2004 | Liang et al. |
| 6,795,229 B2 | 9/2004 | Liang et al. |
| 6,839,158 B2 | 1/2005 | Albert et al. |
| 6,850,355 B2 | 2/2005 | Liang et al. |
| 6,956,690 B2 | 10/2005 | Yu et al. |
| 6,970,154 B2 | 11/2005 | Sheridon |
| 6,987,603 B2 | 1/2006 | Paolini, Jr. et al. |
| 7,017,895 B2 | 3/2006 | Sakamoto |
| 7,057,599 B2 | 6/2006 | Engler et al. |
| 7,071,895 B2 | 7/2006 | Wampler |
| 7,075,502 B1 | 7/2006 | Drzaic et al. |
| 7,116,466 B2 | 10/2006 | Whitesides et al. |
| 7,167,155 B1 | 1/2007 | Albert et al. |
| 7,177,067 B1 | 2/2007 | Sakamoto |
| 7,184,197 B2 | 2/2007 | Liang et al. |
| 7,271,947 B2 | 9/2007 | Liang et al. |
| 7,312,916 B2 | 12/2007 | Pullen et al. |
| 7,369,299 B2 | 5/2008 | Sakurai et al. |
| 7,929,198 B2 | 4/2011 | Lipovetskaya et al. |
| 8,049,954 B2 | 11/2011 | Lipovetskaya et al. |
| 8,068,271 B2 | 11/2011 | Lipovetskaya et al. |
| 8,233,212 B2 | 7/2012 | Lipovetskaya et al. |
| 2001/0001050 A1* | 5/2001 | Miyashita et al. ............ 428/690 |
| 2002/0106847 A1 | 8/2002 | Kazlas et al. |
| 2002/0140133 A1 | 10/2002 | Moore |
| 2002/0197554 A1 | 12/2002 | Wolk et al. |
| 2004/0169462 A1* | 9/2004 | Sasaki ........................ 313/503 |
| 2004/0179146 A1 | 9/2004 | Nilsson |
| 2006/0050363 A1 | 3/2006 | Chopra et al. |
| 2006/0215253 A1 | 9/2006 | Kanbe |
| 2008/0100907 A1 | 5/2008 | Lipovetskaya et al. |
| 2009/0231251 A1 | 9/2009 | Shoji |
| 2010/0035377 A1 | 2/2010 | Gobrogge et al. |
| 2010/0097687 A1 | 4/2010 | Lipovetskaya et al. |
| 2010/0309543 A1 | 12/2010 | Lipovetskaya et al. |
| 2011/0157683 A1 | 6/2011 | Lipovetskaya et al. |

OTHER PUBLICATIONS

US Final Office Action dated Dec. 27, 2010 issued in U.S. Appl. No. 12/790,590.
US Notice of Panel Decision from Pre-Appeal Brief Review dated Jul. 21, 2011 issued in U.S. Appl. No. 12/790,590.
US Notice of Allowance dated Aug. 10, 2011 issued in U.S. Appl. No. 12/790,590.
US Office Action dated Jul. 14, 2010 issued in U.S. Appl. No. 12/579,271.
US Final Office Action dated Feb. 2, 2011 issued in U.S. Appl. No. 12/579,271.
US Notice of Allowance dated Aug. 10, 2011 issued in U.S. Appl. No. 12/579,271.
US Office Action dated Mar. 9, 2010 issued in U.S. Appl. No. 11/973,883.
US Final Office Action dated Oct. 5, 2010 issued in U.S. Appl. No. 11/973,883.
US Notice of Allowance dated Dec. 15, 2010 issued in U.S. Appl. No. 11/973,883.
US Office Action dated Jun. 24, 2011 issued in U.S. Appl. No. 13/045,367.
US Final Office Action dated Dec. 23, 2011 issued in U.S. Appl. No. 13/045,367.
US Notice of Allowance and Allowed Claims dated Apr. 3, 2012 issued in U.S. Appl. No. 13/045,367.
PCT International Search Report and Written Opinion dated Apr. 17, 2008 issued in PCT/US2007/080842.
PCT International Preliminary Report on Patentability and Written Opinion dated Apr. 15, 2009 issued in PCT/US2007/080842.
PCT International Preliminary Report on Patentability and Written Opinion dated Jun. 24, 2009 issued in PCT/US2007/088567.
International Search Report, 5 pages and Written Opinion, 6 pages, mailed May 15, 2008, filed on Dec. 21, 2007 for PCT/US2007/088567.
US Office Action dated Aug. 1, 2012 issued in U.S. Appl. No. 12/579,292.
U.S. Final Office Action dated Mar. 25, 2013 for U.S. Appl. No. 12/579,292.

* cited by examiner

HEMISPHERICAL COATING METHOD FOR MICRO-ELEMENTS

CROSS-REFERENCE TO RELATED APPLICATIONS

This application claims priority under 35 USC 119(e) from U.S. Provisional Patent Application No. 60/876,767 naming Lipovetskaya et al. as inventors, titled "Hemispherical Coating Method for Micro-Elements" filed Dec. 22, 2006, which is herein incorporated by reference in its entirety and for all purposes.

FIELD OF THE INVENTION

The present invention pertains to methods of partially coating substrates having small dimensions. In particular, it relates to methods of fabricating hemispherically coated bichromal spheres for use in rotating element displays.

BACKGROUND OF THE INVENTION

Rotating element displays (REDs) are a class of electro-optic displays that use rotation of optically and electrically anisotropic elements, such as spheres, in response to an electric stimulus, for producing images. REDs include widely known gyricon electronic paper displays, which were first developed in 1970s at Xerox's Palo Alto Research Center. Further development of REDs, however, was hampered at least in part due to challenges associated with fabrication of uniform populations of optically anisotropic pixel elements.

Typically, gyricon displays employ bichromal spheres composed of wax or plastic hemispheres having dissimilar colors and charges. In one illustrative example, each bichromal sphere may have a negatively charged black hemisphere and a positively charged white hemisphere. Within the display, each sphere is suspended in a dielectric fluid contained within a cavity formed in a plasticized elastomer. Each sphere is free to rotate in the fluid so that it could turn with black or white side to the viewer, thus providing a pixel with a black or white appearance. When an appropriate voltage is applied to the electrodes addressing selected spheres, the spheres rotate in accordance with their dipole moment and display the image to the viewer.

While rotating element displays may have a variety of configurations, and may employ rotatable elements other than spheres (e.g., cylinders), they all typically require optically and electrically anisotropic elements with small dimensions. For example, electrically anisotropic black-and-white spheres with an average diameter from about 5 to 200 microns have been used in certain RED applications.

Manufacturing of such elements, however, presents many difficulties associated with specific requirements that are imposed on these elements by their intended function. These requirements include controllable distribution of charge and color on the element surface, homogeneity of element populations, size requirements, etc. Problems associated with fabrication of such elements hinder the development of RED technology and RED-based electronic paper products. Therefore, there is a continuous need for fabrication methods of optically and electrically anisotropic elements tailored for RED applications.

SUMMARY

Optically anisotropic spheres that can be used as pixel elements in rotating element displays are fabricated by partially (e.g., hemispherically) coating a plurality of spheres by transfer coating methods. Typically, a monolayer of spaced apart monochromal (e.g., white) spheres is formed on a support substrate surface by, for example, making use of a removable template matrix. Next, a uniform layer of viscous coating material (e.g., a black coating) is applied to the monolayer of spheres to transfer at least some of the coating material onto the surface of spheres in a monolayer. The resulting partially coated spheres are optionally cured by a UV or thermal exposure and can then be removed from the support substrate. In some embodiments, the coating material also imparts electrical anisotropy to the spheres. Transfer coating methods result in improved precision of hemispherical coating and allow use of environmentally robust pixel elements, such as glass, ceramic, and plastic elements having high melting or glass transition temperatures.

In one aspect, a method of preparing anisotropic elements (such as spheres, cylinders, elliptical shapes etc.) includes operations of forming a monolayer of spaced apart elements on a support surface; contacting the elements with a substantially uniform layer of viscous coating material to transfer at least some of the coating material from the layer of coating material to the spaced elements on a support surface; separating the monolayer of elements from the layer of coating material; and optionally removing the monolayer of elements from the support surface. In many embodiments the described methods are used for partially coating spheres or other elements having a diameter or width of less than about 1 mm. In some embodiments, this method is used for fabrication of optically anisotropic elements that can be used in electro-optic displays.

In some embodiments the elements are spheres. Typically for RED applications, spheres with an average diameter ranging from about 25 to about 150 micrometers (e.g., from about 40 to 70 micrometers) are employed. The spheres or other elements subjected to transfer coating may be uncoated or pre-coated, can be solid or hollow and can be made of a variety of materials, such as glass, ceramic, and environmentally stable polymeric materials.

Generally, an element possesses a first color or an optical property and the coating material imparts a second color or an optical property that is dissimilar from the first optical property to a portion of the element's surface. For example, an element having a first diffuse reflectance value can be coated with a coating having a different diffuse reflectance value. In some embodiments monochromal, light-colored (e.g., white) elements are coated with a dark (e.g., black coating). The coating may cover about 50% of each element's surface area (e.g., be hemispherical), but in some embodiments the coating may cover about 30-70%, e.g., about 40-60% of a surface area of each of the elements.

Typically a plurality of elements is processed during transfer coating. In one example, at least about 100 elements are simultaneously contacted with a layer of viscous coating material during transfer coating operation.

In some embodiments, the monolayer of spaced spheres is formed so that the minimum distance between the spheres is at least about 50% of an average diameter of the sphere, typically around one diameter. In some specific examples, this distance is at least about 30 micrometers. Such spacing prevents the bridging of transfer coating between neighboring spheres, that might otherwise occur during transfer coating operations. In some embodiments, forming the monolayer of spaced apart elements involves releasably attaching the elements to the support surface by, for example, using an adhesive or a pressure gradient.

According to some embodiments, forming the monolayer of spaced elements fixed on a support surface includes operations of providing a support substrate having an adhesive surface; applying a template matrix having open cells to the adhesive surface of the support substrate; and dispensing a plurality of the elements onto the template matrix attached to the support substrate to achieve spacing between elements and to achieve adhesion of elements to the support substrate, thereby forming a monolayer of the elements, wherein open cells of the matrix contain no more than one element per cell, and wherein each of the elements is adhesively attached to the support surface.

In some embodiments dispensing a plurality of the elements onto the template matrix attached to the support substrate to achieve spacing between elements and to achieve adhesion of elements to the support substrate is implemented by providing the elements onto the matrix attached to the support substrate; agitating the support substrate to fill the open cells of the matrix with the elements; allowing the elements within the cells to attach to the support surface; and removing the unattached elements.

In some embodiments the open cells of the template matrix have an average diameter or width or area about 10-50% larger than a diameter or width of the elements. In one example, the elements are spheres having an average diameter in the range of about 45-53 micrometers, and the template matrix is a mesh, having open cells with an average diameter or width in the range of about 54-65 micrometers.

In some embodiments, the template matrix is temporary and is removed before the coating material is applied to the monolayer of elements. For example, the temporary matrix may include a mesh, which can be adhesively attached to the support surface, and can be carefully removed from the support surface without moving the elements from their fixed positions after a monolayer of spaced apart elements is formed.

In certain embodiments, providing a uniform layer of viscous coating material includes preparing the viscous coating material by mixing the coating material ingredients and forming a uniform layer of viscous coating material on a carrier substrate. Coating materials having a viscosity of about 10,000-250,000, e.g., about 30,000-250,000 centipoise exhibited good coating performance. In some embodiments, applying coating material results in formation of partially coated elements having a charge distribution, as desired for RED applications. This can be achieved, for example, by using coating material possessing permanent charge or good chargeability properties. In the latter case charge can be imparted to the coating material by, for example, methods involving friction.

Coating materials usually contain a binder and a pigment, and can optionally include a solvent and a charge control agent. Typically the pigment provides necessary optical properties to the coating, while a binder and a solvent are used to control its rheological properties. Charge can be provided by any of the components of the coating formulations. Specifically, charge control agents can be used for enhancing charge or chargeability of the coating material. In some embodiments charge control agent is present in a coating material in a concentration of between about 0.01-5% by weight. In other embodiments, pigments may enhance charge or chargeability of the coating formulations. In a specific example coating material may include between about 20-50% of pigment by weight and between about 50-80% of binder by weight. In another example the coating material may include between about 1-20% of pigment by weight and between about 80-99% of binder by weight.

The precision of coating can be controlled by using a layer of coating material with a pre-determined thickness. For example, in some embodiments, substantially hemispherical coating can be achieved by using the uniform layer of viscous coating material with a thickness of about 40-60% of the diameter of the spheres that it contacts. In a specific example, the layer of coating material may have a thickness of about 25-30 micrometers.

Typically, transferring the coating material to the elements involves applying pressure to the layer of coating material contacting the layer of spaced elements or applying pressure to the layer of spaced elements contacting the layer of coating material. In some embodiments pre-determined amount of pressure may be applied to control precision of coating.

After the coating material is transferred to the elements, the coating can be subjected to a UV or thermal treatment to shorten the binder curing time. In those embodiments, where the elements are releasably attached to the support surface, curing is performed, in certain cases, before the partially coated elements are released from the support surface.

In certain embodiments, removing the monolayer of elements from the support surface is performed by scraping the elements off the support substrate or by dissolving the adhesive to release the elements from the support substrate.

In another aspect a method of preparing optically anisotropic elements for an electro-optic display involves operations of releasably attaching display elements to a first substrate to form a monolayer of the display elements on the first substrate, wherein the display elements are spaced apart from one another in the monolayer; coating exposed surfaces of the display elements with a first coating material while the display elements are attached to the first substrate; releasably attaching the display elements to a second substrate to form a second monolayer of spaced apart elements, wherein the elements of the second monolayer expose surfaces not coated by the first coating material; and coating the uncoated surfaces of the display elements with a second coating material. Coating with first and second coating materials can be accomplished by transfer coating methods as described above. This aspect provides methods of coating elements with multiple partial coatings. For example, two different hemispherical coatings can be applied to a sphere using methods of this aspect.

In yet another aspect, a method of preparing optically anisotropic elements for an electro-optic display includes the operations of forming a monolayer of spaced elements releasably attached to a support surface; providing a layer of viscous coating material formed on a substrate surface, wherein the layer of coating material can be formed and provided continuously; moving the support surface with respect to the substrate surface to transfer at least some of the coating material from the layer of coating material to the spaced elements fixed on a support surface; removing the monolayer of spaced elements from the layer of coating material, wherein the elements are partially coated with the coating material; and removing the monolayer of elements from the support surface. In some embodiments, the substrate surface and/or the support surface is a conveyer belt or is connected with a conveyer belt. In some embodiments, the support surface is movable, and forming the monolayer of elements on the support surface can be performed continuously by moving the support surface. According to this aspect, coating of RED elements can be performed continuously in a high-throughput fashion.

While transfer coating methods have been described primarily with reference to the RED applications, in some aspects the coating methods can be used in other areas of technology. For example, partially coated elements will be useful in certain biotechnological applications, e.g., where non-specific binding can be detected on uncoated portions of an element. Generally, elements having a partial coating, wherein the coating exhibits specific chemical reactivity, may be used in chemical and biotechnological fields, e.g., as sensors. Yet in other aspects, transfer coating methods may be used in microprinting technologies, MEMs fabrication, etc.

These and other features and advantages of the invention will be described in more detail below with reference to the associated drawings.

DETAILED DESCRIPTION OF A PREFERRED EMBODIMENT

Introduction and Overview

Figure 1:
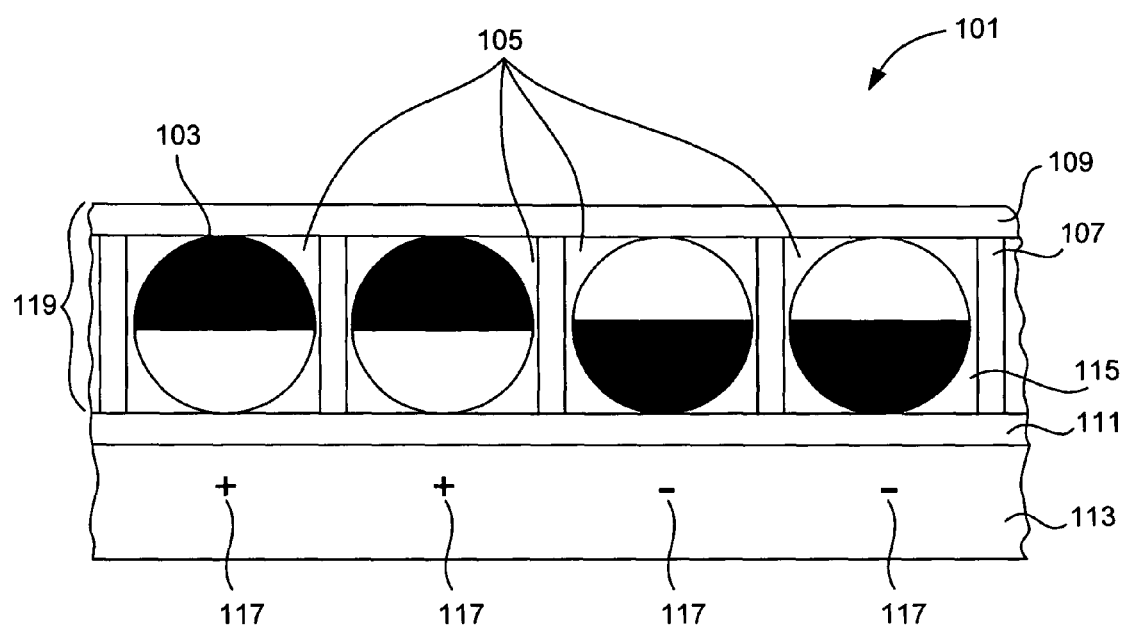
FIG. 1 illustrates a cross-sectional side view of an example rotating element display, in which coated display elements can be used.

Transfer coating methods for fabrication of optically and electrically anisotropic display elements are provided. While these methods will be discussed primarily with reference to hemispherically coated bichromal spheres as example display elements, it is understood that other rotatable shapes, such as cylinders, ellipses, football-shaped elements suitable for RED applications can be fabricated by methods described herein and they are within the scope of present invention. Further, display elements possessing a variety of types of optical properties are contemplated. For example, RED elements having retroreflective, specularly reflective and luminescent portions may be fabricated according to some embodiments disclosed herein. It should be further noted, that in some embodiments RED elements need not be hemispherically coated and may include coatings with an area that is greater or smaller than 50% of the element's surface area as dictated by design parameters; e.g., the coatings may be intended to cover about 40% or less of the surface area and/or about 60% or greater of the surface area. Further, due to processing variations, etc., the fractional coverage of the coating may vary from element to element within a population of coated elements.

As indicated, electrically and optically anisotropic elements should preferably fulfill certain requirements in order to successfully serve as pixel elements in REDs. Depending on the intended function of an RED, bichromal spheres with a wide range of sizes may be used as pixel elements. While in some applications REDs may not require high resolution or may be intended to be viewed from a large distance (e.g., billboard signs), in other, more common applications, the displays should be readable from a small distance of only 10-100 cm and therefore should possess high resolution and consequently relatively small pixel size. This can be achieved by employing bichromal spheres having an average diameter in the range of about 25-150 micrometers. Methods provided by embodiments disclosed herein can be used for fabricating spheres in this size range and larger. Generally, spheres with an average diameter ranging from about 35 to 100 micrometers, e.g., from about 40 to 70 micrometers are sufficiently small for most common RED display applications.

For many applications, the sphericity of rotating spheres should be high (e.g., at least about 95%), and the size distribution in the population of spheres should be relatively narrow. In some examples, populations of coated spheres ranging from about 45 to 49 μm in diameter, from about 53 to 63 μm, or from about 90 to 106 μm can be used in an individual display. Fabrication methods described herein make use of commercially available spheres with high sphericity and narrow size distributions, which can be further improved by sieving operations. Such spheres are subjected to hemispherical coating process, resulting in a uniform population of display elements that could not be readily achieved by previously known methods.

Other desirable features of RED elements include stability of the rotating sphere surface to the dielectric fluid in which it is immersed, and environmental stability of the RED elements. The latter feature received little recognition in previously designed REDs. A number of previously reported gyricon displays used low molecular weight polymers and waxes as rotating sphere materials. The materials employed typically possessed low melting points and easily decomposed when exposed to high temperature, high humidity and UV light. Therefore, displays fabricated using such environmentally unstable elements could not be used in outdoor applications (e.g., in outdoor signage, such as gas station signage) or in certain specialty applications (e.g., in factory environments), and generally had low reliability and lifetime.

In certain embodiments of the present invention, rotating elements are made of environmentally stable materials, such as glass and ceramic materials or polymeric materials having high melting temperatures or glass transition temperatures. In some embodiments, materials with a melting point or glass transition point of at least about 100° C. are used. Note, however, that in certain embodiments, the coating methods of this invention can be applied to materials with low environmental stability, such as low-melting waxes and plastics.

Generally, methods used for fabricating rotating spheres disclosed herein provide good control over charge and color distribution within each sphere. In certain applications, precisely hemispherical coatings of charge and color in a pixel element may be required, while in other applications significant deviations from hemispherical coating (e.g., up to 20% deviation from hemispherical coating) can be tolerated. Transfer coating methods of this invention provide inexpensive ways to control the precision of coating and typically do not require use of masking or other labor-intensive operations. In some embodiments of this invention transfer coating methods may make use of masks to achieve further improvement in precision of coating transfer.

In general, methods disclosed herein allow low-cost fabrication of small-size bichromal spheres having controlled color and charge distribution as well as high environmental stability. These methods achieve these advantages by using a new coating process which can be applied to commercially available spheres having high sphericity and narrow size distribution.

While coating methods provided herein may find use in other applications beyond RED manufacturing, the RED context will be herein described in detail.

Examples of Rotating Element Displays

Bichromal spheres having non-uniform charge distribution can be used in a variety of RED configurations. For some embodiments, they may be used in classic gyricon configurations, e.g., they can be randomly distributed within an elastomer or arranged in a closely packed monolayer in the front plane of the display. Example gyricon display configurations are described in U.S. Pat. No. 4,143,103 (METHODS OF MAKING A TWISTING BALL PANEL DISPLAY issued Mar. 6, 1979) and in U.S. Pat. No. 5,754,332 (MONOLAYER GYRICON DISPLAY issued May 19, 1998), which are both incorporated herein by reference. In other embodiments, rotating spheres may be employed in an RED front plane that includes a special containing matrix. Such displays are described in detail in commonly assigned U.S. Patent Application Ser. No. 60/850,883 entitled ELECTRO-OPTIC DISPLAY filed Oct. 10, 2006 naming Yelena Lipovetskaya et al. as inventors, which is herein incorporated by reference in its entirety.

An example section of a display structure will now be provided. Referring to FIG. 1, a cross-sectional view of an example display structure is illustrated. The viewable direction is indicated by an arrow 101. Electrically anisotropic bichromal spheres 103 are rotatably disposed within cells 105 defined by matrix walls 107, a front electrode layer 109, and a matrix base 111. A backplane 113 is attached to the matrix base 111. The spheres are immersed in fluid 115, so that they can freely rotate when an electric field is applied. A plurality of electrodes 117 (no details depicted), are distributed in two dimensions on the backplane 113, so that each electrode can independently control a discrete region of the display, typically a single cell and sphere. Alternatively, one electrode can control multiple spheres. In one example, each sphere and associated backplane electrode together corresponds to one pixel on the display. Electrodes may be controlled by switching devices, such as thin film transistors (TFTs), thin film diodes (TFDs) and, in certain embodiments, MIM switching devices. Suitable backplanes are described, in one example, in the U.S. Patent Application Pub. No. 2004/0179146A1 published May 4, 2006, naming Boo Nilsson as an inventor, which is herein incorporated by reference in its entirety.

The front electrode layer 109 typically contains one or more electrodes and is usually composed of a conductive transparent material, such as indium/tin oxide (ITO) coated on polyethyleneterephthalate (PET). Other conductive transparent materials suitable for front electrode layer include conductive polymers (e.g. PEDOT (poly(3,4-ethylenedioxythiophene)), or PSS:PEDOT (Poly(3,4-ethylenedioxythiophene) with poly(styrenesulfonate)), carbon nanotubes, doped oxide materials, such as aluminum/zinc oxide, and the like. These materials can be used either alone or as coatings on transparent substrates, such as PET. The front electrode layer should, preferably, have very high light transmissivity. For example, transmissivity of greater than about 82%, preferably greater than about 85% is preferred. ITO-PET films with these transmissivity properties are commercially available from a number of suppliers, such as CPFilms Inc. of Fieldale, Va. and Sheldahl Inc. of Northfield, Minn. Typically, the front electrode layer is a single sheet of electrode material covering all or a significant fraction of the pixels (and rotating elements) in the display. This is in distinction from the backplane electrodes, where each electrode is associated with a single pixel. The potential differential between the front and back electrodes creates the necessary electric field for rotation of the spheres. In some embodiments, however the front electrode layer may include a plurality of electrodes, wherein each electrode may address individual pixels or individual rotating elements of the display. Note that the assembly 119 is usually referred to as the "front plane" of the device and includes the front electrode layer 109, the matrix, the spheres, and the fluid.

In one example, the bichromal spheres 103 have a positively charged black hemispherical coating, while the remaining hemisphere is white and uncharged (or negatively charged). When an appropriate potential difference is applied between the electrodes on the back and front planes, the sphere in a pixel element will rotate so as to align its charges with the applied electric field, thereby presenting a black or white hemisphere to the viewer. The rotation between states is preferably by about 180±15°, so that a black or white hemisphere is fully visible.

Incident light falls onto the display from the direction shown by arrow 101. After it passes through the transparent front electrode layer, it is absorbed or reflected by the spheres, depending on the hemisphere that is presented to the viewer. Light is absorbed on the array of black hemispheres and is reflected by the white hemispheres, thereby creating a black image on a white background. Of course, in other embodiments, display elements may employ other colors or other optical properties to achieve desired optical effects. Examples of display elements that can be fabricated by transfer coating methods provided herein will be now described in detail.

Rotating Elements

Rotating spheres or other elements fabricated by transfer coating methods described herein possess optical and electrical anisotropy and are well suited for RED applications. Typically optical and electrical anisotropy is provided by a hemispherically applied coating material. Generally, such material possesses optical properties that are different from the optical properties of the sphere to which it is applied, and also in some embodiments, provides non-uniform charge distribution to the display element. In some embodiments, the coating material may possess a permanent charge, while in other embodiments it may possess good chargeability, so that it is charged before or after it is applied to the sphere.

The core sphere to which a hemispherical coating is applied may be solid or hollow and uncoated or coated. For example, a black hemispherical coating can be applied to an opaque white glass sphere (e.g., a glass sphere impregnated with $TiO_2$ white pigment), a ceramic sphere entirely coated with white coating, or to a transparent glass sphere hemispherically coated with a white coating.

Generally the optical properties of the core sphere are only important when a portion of the sphere remains uncoated and is viewable by an end user during operation. Thus, there will be some embodiments, particularly those in which two opposite hemispherical coatings are applied, in which only the optical properties of coatings will have relevance to display performance. In other embodiments, particularly those employing only one hemispherical coating, the optical properties of the core will be important.

Viewable portions of the core sphere or of any of its coatings (hemispherical or non-hemispherical) can possess a number of optical properties, which serve as the basis for the optical anisotropy. Examples of such properties include color, diffuse reflectance, specular reflectance, opacity (or transparency), retroreflectivity, luminescence, fluorescence, etc. In specific embodiments opaque colored materials are employed as coatings and/or core spheres.

Figure 2:
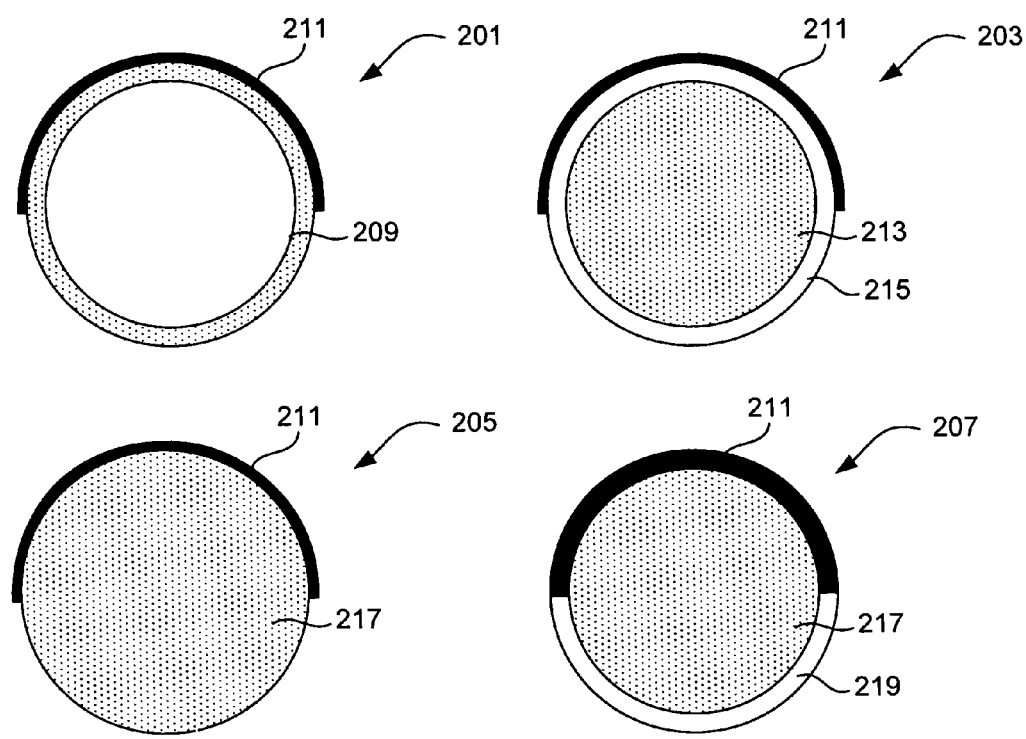
FIG. 2 shows cross-sectional side views of bichromal spheres that can be obtained by using transfer coating methods provided herein.

Examples of coating arrangements that can be obtained by coating methods provided herein are illustrated in FIG. 2, which presents cross-sectional depictions of hemispherically coated display elements 201, 203, 205, and 207. In example display element 201 a hollow core sphere 209 is hemispherically coated with a black coating 211. The viewable hemisphere of core sphere 209 can possess any optical property that is different from the black coating. For example, it can be colored light-yellow, light-green, white, or any other light color. Alternatively, or in addition, it may possess a reflectivity, retroreflectivity, etc. that is different from that of black coating. In example display element 203, a solid sphere 213 is completely coated with a white coating 215, which is in turn hemispherically coated with a black coating 211 applied on top of the white coating 215, thereby affording a black-and-white appearance. In another example display element, 205, a solid core sphere 217 is employed which is hemispherically coated with black coating 211. The viewable hemisphere of core sphere 217 can have any color that is different from black. In yet another example display element, 207, a solid core sphere 217 can be coated with two hemispherical coatings on opposite portions of the sphere—a black hemispherical coating 211 and a white hemispherical coating 219. A variety of other combinations of solid and hollow spheres may be used. Generally, however, if the core sphere possesses acceptable optical properties (e.g., high diffuse or specular reflectance) it may require just one hemispherical coating having a dissimilar optical property, as shown in examples 201 and 205. If optical properties of the core sphere are not acceptable for a particular application, it may be first completely coated with a first coating material by methods known to those skilled in the art, followed by hemispherical coating with a second coating material by methods disclosed herein. Such a sequence will result in a hemispherically coated element, such as sphere 203. Alternatively, methods are herein provided for applying two dissimilar hemispherical coatings to different portions of a core sphere affording a bichromal structure, such as 207.

Transfer coating methods provided herein allow expansion of the variety of materials used as display elements. In contrast to the extrusion methods employed in fabrication of prior gyricon pixel elements, which were typically low-melting polymers, transfer coating methods of this invention can be applied to spheres composed of virtually any type of material. Thus, materials having a wide variety of optical properties and densities may be used. This means that pixel elements can be better matched (in density for example) to the dielectric fluid in which they are suspended. This in turn means that the variety of dielectric fluids available for use in REDs is also expanded.

As noted, the spheres to which hemispherical coating is applied can possess a number of optical characteristics. For example, white, black, transparent, opaque, specularly reflective, retroreflective, or luminescent spheres can be subjected to partial coating that provides a different optical property thereby affording an optically anisotropic sphere. In a specific example, opaque white spheres can be partially coated with opaque black hemispherical coating. While a combination of black and white colors on spheres provides the highest contrast images, other color combinations can be used as well. Especially advantageous combinations include those in which one side of the sphere is substantially darker than the other, e.g., white and red, yellow and blue, yellow and black, or any other light and dark combination.

Light and dark colors are relative properties. However, in certain embodiments presented herein, light colors are defined as those having at least about 50%, preferably above about 80% reflectance. In certain embodiments the black or darker color has a reflectance of less than about 10%, more preferably less than about 5%, and even more preferably less than about 2%. In other embodiments, the colors of rotating elements, need not necessarily be light and dark, but may be complementary to each other so that a desired visual effect is created. For example, black and orange, black and red, white and blue or other color combinations capable of creating a well viewable image, may be used, regardless of relative lightness or darkness of these colors.

Note that it can be difficult to measure the reflectance values of small curved objects such as the rotating elements fabricated in this invention. To address this challenge, reflectance can be measured from a large set of rotating elements in a close packed arrangement in a monolayer (e.g., a hexagonal close pack arrangement) attached to adherent tape. Obviously, the reflectance value is function of the color of the tape background. The above values of reflectance may be measured using white tape (i.e., tape providing a white background for the reflectance measurements). A common technique may involve measuring spectral response of a sample using an industry standard spectrometer, such as a Gretag Mcbeth Spectroscan.

While some applications may require high-contrast images, in other applications high contrast may not be needed. For example, green/tan color combination can be used to produce an electronic material with a camouflage-like appearance for military applications, and the like.

As noted, aside from possessing different colors, the spheres can possess other types of optical anisotropy. For example, hemispheres with different levels of diffuse and specular reflectance can be used. In some embodiments one hemisphere has a high specular reflectance, while the other is opaque and dark-colored. For example, a specularly reflective glass core sphere can be hemispherically coated with a dark pigment, without application of a white layer.

In other examples, the rotating elements may have retroreflective or light-emitting portions. Further, rotating elements having luminescent (e.g. fluorescent or phosphorescent) portions may also be used. These, for example, may be prepared by applying hemispherical coating doped with luminescent material to the core sphere, or by applying hemispherical coating of any desired color to a luminescent sphere.

As indicated, for many applications the spheres should be relatively small in order to provide good display resolution. Appropriate sizes include spheres with diameter ranges of about 25-150 µm, preferably 35-100 µm, for example about 50 µm. Obviously there may be some variance in the sizes of the spheres in a given display. This can be controlled by appropriate sizing techniques such as sieving. It is desirable that populations of spheres with narrow size distribution are used in a single display. In some embodiments, populations with a size range of not greater than 8 micrometers, preferably not greater than 3 micrometers are used.

It should be realized that much larger elements may be used in certain embodiments. For example, for billboard signs that are typically viewable from the distance of several hundred feet, rotating elements having a relatively large size, e.g., a diameter of up to about 1-2 inches, may be appropriate. In general, elements of any size, that would produce a good display resolution for a particular application of the display, will be suitable.

As mentioned above, generally the sphericity of rotating spheres should be high (e.g., at least about 95%). The hemispherical coating layer can be about 1-2 µm thick for a sphere with a diameter of about 50 µm, and should not significantly distort sphericity of the elements. In certain embodiments, the surface roughness of this coating does not exceed about 0.5 µm.

The materials used for the core sphere and for the coatings should preferably, though not necessarily, have a melting point or glass transition point of higher than 100° C., in order to withstand high-temperature operations that may be performed during display manufacturing process and exposure to high temperature during end use. The coating materials should also be compatible with the fluid in which the spheres will be suspended for rotation, e.g., they should not dissolve or swell in this fluid. Further, it may be desirable to employ elements having a density that is similar to that of the dielectric fluid. In certain embodiments, the spheres, or at least the core sphere is made from a material such as glass, ceramic, or polymer. The spheres, although they can be made from intrinsically brittle materials, in certain embodiments, should have good crushability characteristics. For example, they may be able to withstand compressing liquid pressure in the range of 350-3000 psi, as used in the standard industry crushability test.

Depending on the display design criteria, the spheres may have a density of between about 0.4 and 6 g/cm$^3$, preferably between about 2.0 and 3.0 g/cm$^3$. In certain embodiments, it may be advantageous to use hollow spheres, which may be made of glass, ceramic, or high-temperature resistant polymeric materials. Such spheres may have densities ranging from 0.03-2.8 g/cm$^3$. Solid glass, ceramic, or polymeric spheres with densities ranging from about 1 to 6 g/cm$^3$ can also be used.

The core spheres with such characteristics can be obtained from various commercial suppliers. In some cases, these spheres are marketed for surface processing applications. It may be necessary to sieve commercially obtained spheres in order to ensure a tight size distribution suitable for rotating element displays. For example, hollow and solid glass spheres can be obtained from 3M Corporation, Maplewood, Minn. (Scotchlite glass bubbles, K-series (e.g., K1, K15, K25, K32, or K46)), and Mo-SCI Corporation, Rolla, Mo. In addition, hollow glass spheres can be obtained from Potters Industries, Berwyn, Pa. Ceramic spheres can be obtained from Saint-Gobain Coating Solutions, Northampton, Mass., and plastic spheres can be obtained from Asia Pacific Microspheres SDN BHD, Selangor Darul Ehsan, Malaysia & Grinding Media Depot, Wyncote, Pa.

The display elements should be electrically anisotropic, in order to rotate in response to applied electric fields of defined magnitudes. Electric anisotropy does not necessarily imply that the two hemispheres are oppositely charged. It is sufficient, that there is some nonuniformity in the charge distribution about the surface of the sphere and that this nonuniformity correlates with optical anisotropy. A variety of different charge anisotropies are possible.

Figure 3:
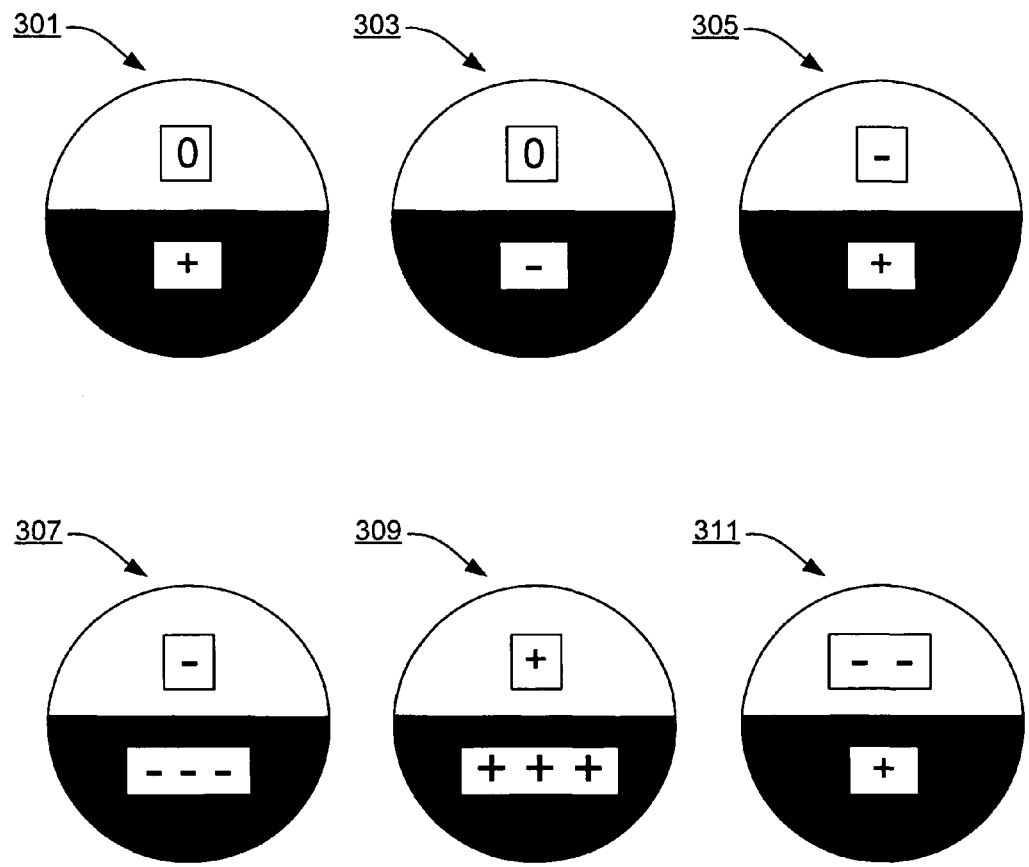
FIG. 3 presents selected examples of charge distributions suitable for providing electrical anisotropy to the spheres.

Some of the examples are shown in FIG. 3. As illustrated by spheres 301 and 303, one hemisphere can be neutral, while the other can be positively or negatively charged. In sphere 305, the hemispheres have opposite charges of equal magnitude. It is also possible to have oppositely charged hemispheres with one charge being greater than the other as illustrated by sphere 311. In sphere 307 both hemispheres are negatively charged and higher charge density exists on a black hemisphere. In another example, depicted by sphere 309 both hemispheres are positively charged, with higher charge density residing on a black hemisphere. In general, spheres having any nonuniformity in charge distribution about their surface, e.g. a dipole moment, can be used. In one embodiment, a significant quantity of charge is provided to the sphere via the coatings, particularly by the hemispherical coating, while the core sphere is neutral or possesses a small amount of charge. In other embodiments, the core sphere may be charged, while the hemispherical coating preserves the charge from dissipating from that hemisphere.

In one embodiment, the coating is relatively thin in comparison to the dimensions of the sphere (e.g., about 1-2 µm thickness). The coating should provide optical and surface properties as presented above (e.g., reflectivity, opacity, color, and roughness). In certain embodiments, the coating is made from binder and a pigment. In some embodiments, a solvent may be added for manufacturing. In some embodiments, a special charge control agent may be added. These will be discussed in further detail in the following section.

Throughout this document, hemispherical optical and electrical properties are discussed. This does not imply that the optical or electrical properties are limited to exactly hemispherical dimensions. In certain embodiments, the elements may be designed to have one optical material occupy less than a full hemisphere of the element's surface and another optical material occupy more than a full hemisphere. In some embodiments, it may be advantageous to have more than two optically different portions within one sphere. For example a sphere having two less than hemispherical coatings (e.g. opaque black and white) with a transparent strip separating them may be useful for some applications. The strip will provide a clear transmissive effect that is very different from normal black and white appearance. Examples of elements of this type are described in U.S. Pat. No. 5,892,497, filed Apr. 6, 1999, which is herein incorporated by reference in its entirety. Methods provided herein allow good control over amount of coating that is applied to the processed sphere, and virtually any desired amount of coating, can be transferred to the processed sphere during fabrication. For example, a coating may occupy about 30%, about 40%, or about 50% of the total area of the sphere. For many applications, a coating of about 40-60% of the total area of a sphere is appropriate.

Further, even if the desired result is hemispherical, it should be noted that suitable displays may be produced, in certain embodiments, using populations of rotating elements that have significant variance in the geometric extent of the optical or electrical properties. For example, it may be suitable to use a population of rotating elements having optical coatings that vary on average by 10% or even 20% from a perfectly hemispherical covering. Other applications may not tolerate such wide variance. Methods presented herein allow transfer of coating with high precision. For example precision of about 5% in the coated area of spheres in a population can be achieved for spheres with an average diameter of 50 µm.

Compositions of Coating Materials

According to some embodiments of coating methods described herein, the coating material is relatively viscous and highly homogenous. Such compositions may include intimately mixed binders and pigments, to which charge-enhancing compounds and solvents may be optionally added. It is desirable to employ high quality mixing processes in order to achieve good uniformity of coating compositions. Preferably, the coating formations contain little if any "large" particles capable of distorting sphericity of coated spheres or increasing surface roughness. For example, in some embodiments, no particles larger than about 0.1 µm should be present.

Uniform compositions may be obtained using many different techniques and apparatus known to those of skill in the art. In some embodiments, the compositions are obtained by mixing the coating components in commercially available mixers that can provide mixing speeds of at least about 1300 rpm (e.g., 10000 rpm and higher), such as mixers available from Charles Ross & Son Co., Hauppauge, N.Y. Alternatively, an inline mixing system can be used for producing coating formulations on demand. Such system is available from Bematek Systems, Inc., Beverly, Mass. It is generally advantageous to use higher shear during mixing, since it improves dispersion of pigment particles, and may also induce higher charge onto the coating composition.

In some embodiments, the coating material possesses a permanent charge. In other embodiments, the coating material may have good chargeability, and the necessary charge can be applied at any point before or after coating, for example, by methods involving friction. For example, friction may be applied while the coating material is mixed or dispensed. In another example, friction may be applied to coated spheres upon completion of the coating process. Yet in other embodiments, the coating may only be used to provide necessary optical properties, while charge may be provided by the core sphere or by second hemispherical coating. For example, the charge may be induced onto the core spheres prior to coating, by subjecting the spheres to corona treatment. In one embodiment, inducing a charge onto spheres involves moving a monolayer of spaced spheres (e.g., spheres residing within the cells of a mesh matrix) in the proximity of one or several wires to which high voltage is applied. For example a monolayer of spheres may be passed beneath a wire under high voltage. A corona discharge is generated resulting in a charge being induced on the spheres. In some embodiments, the portion of the sphere residing in proximity to the corona discharge will have a greater charge than the portion of the sphere residing at a greater distance from the discharge. The hemispherical coating is applied later to encapsulate the induced charge. In one embodiment, the charge residing on the portion of the sphere to which the coating is applied is preserved by the coating, while the charge at the uncoated portion dissipates. In this embodiment, the coating itself does not necessarily need to have any charge-inducing properties, but may serve to merely provide optical anisotropy and to preserve the charge already residing on the portion of the sphere. It should be understood that in some embodiments multiple layers of coatings may be required to achieve the desired optical and electrical anisotropies.

In those embodiments where coating serves as the main source of the charge anisotropy, charge or chargeability can be provided by any of the components of the coating formulation (e.g., a binder and/or a pigment). In some embodiments, these properties are provided or enhanced by special charge-control agents (CCA). Examples of charge control agents include quaternary ammonium compounds, organic sulfates and sulfonates and other compounds known to those of skill in the art, such as those listed in U.S. Pat. No. 6,379,856, issued Apr. 30, 2002 and entitled TONER COMPOSITIONS, which is incorporated herein by reference in its entirety. In certain embodiments, the CCA content in the coating formulation is between about 0.1 to 5% by weight.

Necessary optical properties are typically provided to the coating formulation by pigments, which, in some embodiments, may also be chargeable or permanently charged. In general, a pigment of any color, e.g., black, white, red, yellow, blue, green or a combination of pigments with different optical and/or electrical properties may be used. In selected embodiments, luminescent (e.g., fluorescent or phosphorescent) material may be included instead of (or together with) a pigment.

In some embodiments, pigments having both good chargeability and compatibility with a binder are desired. Examples of such pigments include Clariant Red FGR, Clariant Yellow FGL, Clariant Copy Blue PR01 available from Clariant corporation, Coventry, R.I.; Ferro Black 6331, available from Geode Corporation located in Washington, Pa.; and Mogul L® available from Cabot Corporation, Boston, Mass.

In other embodiments pigments that do not substantially enhance charge of the coating may be used. Examples of such pigments include Ferro Eclipse Black, available from Geode Corporation, Washington, Pa.; Toner Cyan BG, available from Clariant Corporation, Coventry, R.I.; and Dupont $TiO_2$ (white), available from Dupont Corporation, Wilmington, Del.

In some embodiments mixtures of chargeable pigments and non-chargeable pigments can be used in order to attain the desired optical and electrical properties in the coating material. In yet other embodiments several layers of coating may be applied (e.g. forming a laminate coating) in order to tune optical and electrical properties of the coated element. For example, several layers of coating with different chargeability, color, reflectance or refractive index can be applied to achieve optimal performance of a display element.

In some embodiments, coating formulations with a pigment content of up to about 50% by weight is used. For example, formulations having about 20-50% of color-providing pigment and 50-80% of binder are particularly effective for providing desirable coloration. In another example, formulations having about 1-20% of color and charge providing pigment and about 80-99% of binder were found particularly suitable for providing the necessary charge. Combinations of charging and coloration pigments can be used to achieve a total pigment content in excess of 50% by weight, i.e. formulations with 20% chargeable pigment, and 40% colorant pigment for a total of 60% pigment content and 40% binder content can be employed. A variety of binders can be used in the coating material formulations. Preferably such binders will impart desirable rheological and other properties such as relatively high viscosity (as will be further described in the methods section), good pigment suspension and pigment compatibility quality, acceptable pot-life, and good coating quality. A number of binders, such as a number of epoxy binders (e.g., 2-part epoxies) and UV-curable epoxy binders were found suitable. Some examples of suitable binders include but are not limited to Loctite E-30CL, Loctite OA1600/OB1600, both available from Loctite Corporation, Rocky Hill, Conn.; Resin Lab EP965, available from Resin Lab an Ellsworth Company, Germantown, Wis.; 3M-Scotch-Weld DP270, available from 3M Corporation, St. Paul, Minn.; ACMI 6100 series, and ACMI 6600 series single part epoxies, along with ACMI 6050 Semi-Gloss Clear Ink Binder, ACMI 6050 Black Ink, ACMI 6050 White Ink, available from American Coding and Marking Ink Co., Plainfield, N.J.

In certain embodiments, the coating composition includes a solvent or other liquid phase delivery medium. In such cases, the coating material applied to the elements during the coating process may include a solvent, which may be used to modulate the viscosity of the coating material. A variety of commercially available solvents and thinners can be used for this purpose. In a particular example, ACMI 60 50 thinner available from American Coding and Marking Ink Co., located in Plainfield, N.J. can be used. In other examples, a solvent-containing binder or pigment may be purchased and used in the coating formulation. e.g., oil-containing enamels may be used. After application, the composition is allowed to dry (i.e., the solvent is removed by evaporation) to produce the final coating. In some cases, the liquid medium includes certain additives for adjusting the rheological properties of the composition such that it is compatible with the coating process. Such additives include, e.g., surfactants, soluble polymers, etc. In certain embodiments, the coating is cured at room temperature (e.g., cross-linking cure of epoxy binder can be performed at room temperature). In other embodiments curing can be accelerated with thermal exposure (e.g., heating to at least about_120_° C. Irradiation curing, such as light (UV) irradiation cure can be performed at room temperature or at higher temperatures.

Coating Methods

Typically a population of spheres or other elements, such as solid or hollow glass, ceramic or plastic elements as described above, are subjected to a coating procedure. In certain embodiments, the population includes at least about 10, 50, or 100 elements to be concurrently coated—in some cases, the population includes at least about 500 elements or at least about 1000, or at least about 10000 elements or at least about 1000000 elements.

Commonly, monochromal elements are hemispherically coated with a coating having a dissimilar color or other optical property. For example, a black hemispherical coating can be applied to a population of white opaque spheres, or a white hemispherical coating can be applied to a population of black spheres. A variety of combinations of coatings, varying in color and reflectance properties from the core sphere can be used, as described above. In some embodiments, luminescent, retroreflective, or specularly reflective hemispherical coating can be applied.

Figure 4A:
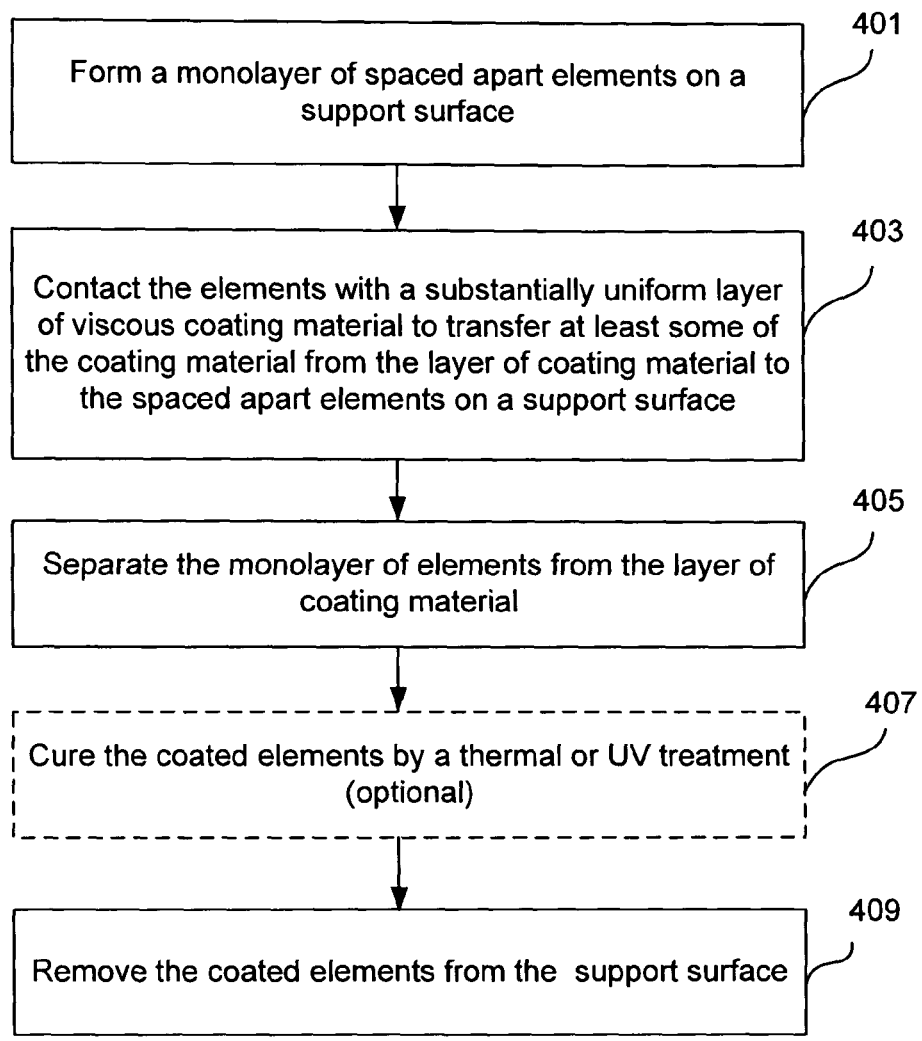
FIG. 4A is an example process flow diagram for a process of partially coating spheres.
Figure 4B:
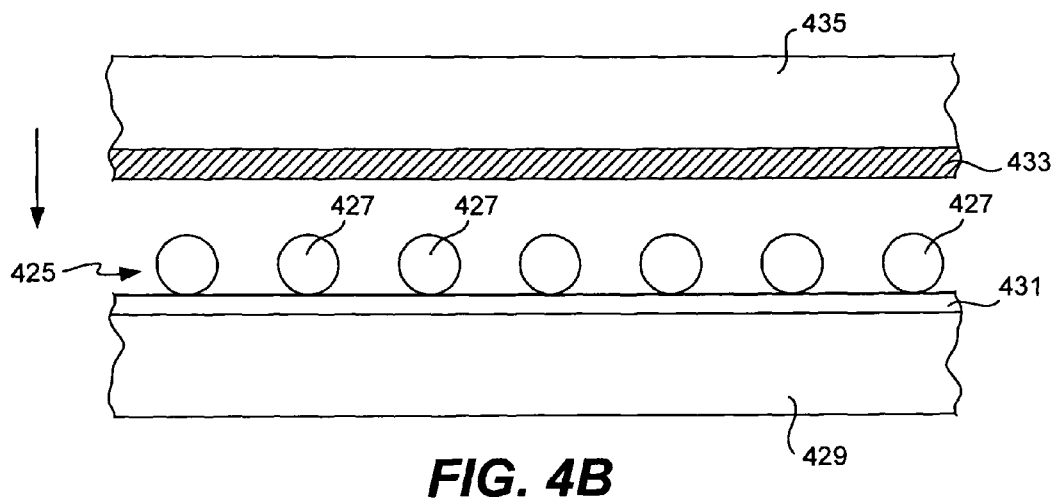
FIGS. 4B, C, and D present a cross-sectional view of a monolayer of spheres on an adhesive substrate being coated by a transfer method.

An example process flow for a typical coating process is presented in FIG. 4A. In the first operation 401, a monolayer of spaced apart spheres is formed on a support surface, which may be stationary or movable, and may be composed of any of a variety of materials, such as glass, plastic, metal, etc. As indicated, a population of at least about 10 spheres, preferably at least about 100 or even 10000 spheres is provided for simultaneous coating. In some embodiments it is more preferable to use very large populations of spheres because they provide more even distribution of pressure during application of the layer of coating material. Such even distribution of pressure helps avoid excessive or uneven transfer of coating material that might otherwise occur when smaller populations of spheres are used. The result of operation 401 is depicted in FIG. 4B, where a monolayer 425 of spheres 427 is formed on a support 429. As shown, spheres 427 are held in place (in spaced apart relation) by a layer of adhesive 431 on support 429.

Generally, the monolayer of elements to be coated exists as a plane or gently curved surface having a thickness that is not substantially greater than the dimensions of a single element. That is, neighboring elements generally protrude to the same extent so that they are well positioned receive the same amount of coating material from a sheet of coating material applied from above. Thus, the elements are not stacked on top of one another and do not protrude to different degrees, at least not locally.

Individual spheres in the population forming a monolayer are spaced apart from each other, preferably by at least about 50% of an average diameter of the spheres (e.g., about 50-100% of the spheres' average diameter). In some embodiments the support substrate carrying the monolayer of spheres has from about 40 to 60% unoccupied surface area. As used herein, the term spacing generally refers to the distance between the closest points of neighboring elements. In a specific example, for spheres with an average diameter of about 50 micrometers, a spacing of at least about 25 micrometers, preferably about 25-40 micrometers between closest circumferential points of neighboring spheres would be appropriate. In one embodiment, spacing of about 30 micrometers is used for spheres with an average diameter of about 50 micrometers. Adequate spacing helps to avoid unnecessary adhesion between neighboring spheres, which might otherwise occur during application of coating material. Therefore, providing spacing between individual elements in a monolayer leads to improved overall yield of the coating process. Techniques used to provide and maintain inter-element spacing will be described in detail in the following sections.

In some embodiments, individual members of a monolayer are releasably attached to an underlying support surface, by, for example, an adhesive force, a pressure gradient (e.g., vacuum), an electromagnetic force, a magnetic force, an electrostatic force, etc. Individual spheres will stay fixed at their positions during application of coating material, and are then released from the support surface when the coating process is complete. In some embodiments, a support surface coated with an adhesive layer is provided and the spheres are adhesively attached to this surface forming a monolayer. Typically, the thickness of an adhesive layer is much smaller than the radius of the sphere, and only a small area of bottom portion of the sphere contacts the adhesive. In alternative embodiments, the thickness of an adhesive layer may be comparable to the sphere radius, and may serve essentially as a mask for subsequent coating operations. For example, the spheres can be hemispherically submerged into an adhesive layer, thereby exposing only one hemisphere for application of coating material. In such embodiments, coating precision may be controlled by an adhesive layer thickness. In some embodiments, no masks are employed, and precise amounts of coating material must be delivered by controlling the transfer process as explained below.

Figure 4C:
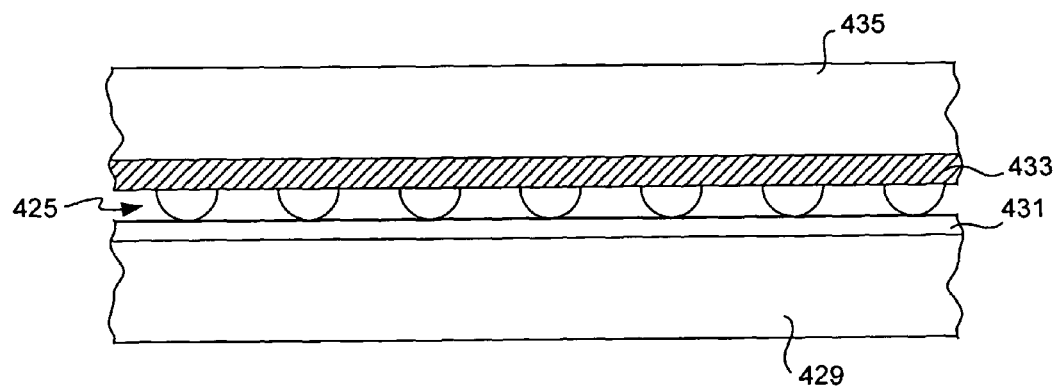

Returning now to FIG. 4A and referring to operation 403, coating is accomplished by contacting the spheres with a substantially uniform layer of viscous coating material to transfer at least some of coating material from the uniform layer to the spaced elements on a support surface. As indicated, a population of many elements is simultaneously contacted with a single layer of viscous coating material. This process is schematically depicted in FIGS. 4B and 4C, where a uniform layer of coating material 433 provided on a carrier 435 is initially positioned above elements monolayer 425 (FIG. 4B). Thereafter, the monolayer and the coating material layer are brought into contact as shown in FIG. 4C. The contact is controlled in this depicted example such that only upper exposed hemispheres of elements 427 touch the coating material.

In many embodiments, high viscosity is a desirable feature of coating material. A highly viscous material can hold onto a carrier substrate without dripping or flowing, and can be applied to the monolayer of spheres in a controlled fashion. A sufficiently viscous coating will not flow uncontrollably over the entire surface of the spheres to which it is applied, but will stay essentially at the point to which it has been transferred. Of course, the material may flow slightly beyond the area of contact in some embodiments. Generally, excessively viscous materials are to be avoided. These may be difficult to transfer, or may form "caps" on tops of the spheres distorting their sphericity. In certain embodiments, the viscosity of the coating material is between about 1,000 and 250,000 centipoise. In specific embodiments, coating formulations with a viscosity ranging from about 10,000 to about 50,000 centipoise exhibited good performance. In other embodiments, more viscous coating formulations with a viscosity ranging from about 30,000 to about 250,000 centipoise are preferred. These viscosity values refer to viscosity of coating material under the conditions of coating transfer. These conditions need not necessarily correspond to room temperature conditions. For example, coating material may be pre-heated or pre-cooled before transfer to modulate its viscosity parameters. Further, solvents and/or other additives may be added to the coating formulations in order to modulate viscosity parameters.

The amount of coating transferred to individual spheres, and hence the precision of hemispherical coating can be controlled via certain parameters. For example, the amount of transferred coating may be controlled by the thickness of a layer of coating material. The layer of coating material is typically formed on a carrier substrate, such as a glass or plastic sheet, or even a roller to a pre-determined uniform thickness. This can be implemented with a bird applicator, a doctor blade, meyer rod on a drawdown coater, or other known coating techniques. Alternatively in roll to roll implementations the coating can be applied using a knife over roller, slot die, or multi-roll coating. The thickness of such layer is usually about the same or is slightly (e.g., up to about 20%) different from the average radius of spheres to be coated if hemispherical coating is desired. For example, for spheres with an average diameter of about 60 micrometers, a layer of coating material with a thickness of about 20-40 micrometers (e.g., 30-35 micrometers) may be used. In another example, for spheres with an average diameter of about 50 micrometers, a coating layer with a thickness of about 20-30 micrometers can be used. In general, coating layers with a thickness of about 30-70%, preferably 40 to 60%, and more preferably about 50% of an average diameter of spheres in a population may provide an essentially hemispherical result, suitable for RED applications. If the desired result is less then hemispherical coating, a thinner layer may be used. Conversely if more than 50% of surface area of the spheres needs to be covered, a thicker layer will be needed. The viscosity of coating material is a factor that should be considered when determining the thickness of coating material layer to be used. Typically, less viscous materials require thinner layers since they coat slightly larger areas than materials with higher viscosity, when applied to sphere surfaces.

Another parameter that can be used to control precision of hemispherical coating is the amount of pressure applied during transfer of coating materials to the surface of the spheres. One or both of the spheres and coating layer is moved into contact with the other. Thus, in some embodiments, the monolayer of spheres attached to a support surface is pressed into the viscous layer of coating material. In other embodiments, the layer of coating material residing on a carrier substrate is applied to the monolayer of spheres with a certain amount of pressure. Usually a contact pressure on the order of about 1-20 psi is employed. Depending on the amount of pressure applied, more or less of the coating material can be transferred from the layer of coating material onto the population of spheres. It is possible to calibrate coating properties for a material with a given viscosity as a function of applied pressure, and thereby achieve precise control over distribution of coating material. For populations of spheres with narrow size distribution, highly precise control over coated area can be achieved by controlling pressure during coating material transfer and by controlling thickness of coating material layer. In some embodiments, only one of these parameters may be controlled. In other embodiments, these parameters may be controlled in conjunction with each other and with modulation of coating material viscosity.

In alternative embodiments, the coating material, which in this case need not necessarily be viscous may be absorbed without forming a distinct layer into an absorbent carrier substrate, such as a polymeric sponge-like material, and can then be transferred onto the monolayer of spaced spheres by pressing the sponge loaded with coating material against the spheres. The precision of hemispherical coating can be controlled by carefully controlling the pressure applied during contact of the sponge and the layer of spheres.

Figure 4D:
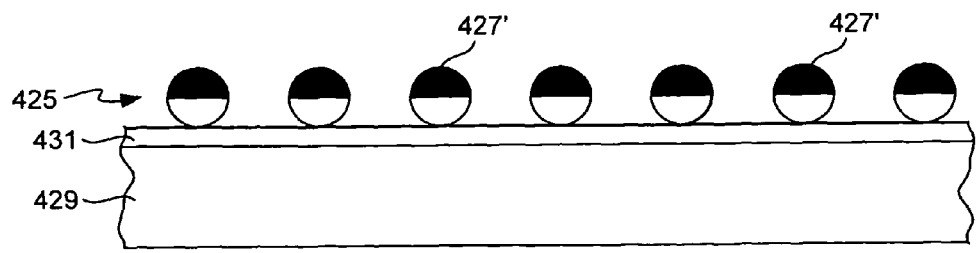

After the coating material has been transferred, contact between the monolayer of spheres and the layer of coating material is released and the monolayer of partially coated spheres is separated and removed from the used layer of coating material residing on the carrier substrate, as shown in an operation 405 of FIG. 4A and in FIG. 4D. The exposed hemispherical coating can be optionally post-treated to improve its properties. In some embodiments, no particular post-treatment may be necessary and curing or hardening of the coating can occur over time under ambient conditions. For example cross-linking curing in epoxy binders can occur spontaneously at room temperature over a period of time. Such cross-linking will typically occur more quickly at higher temperatures. The conditions of any post-treatment are dictated by the composition of the coating material. For example, some thermosetting resins must be cured by thermal treatment or irradiation (e.g., UV or visible light cure) in order to provide adequate hardness and/or adhesion to the core sphere. The conditions of such treatment such as temperature, UV intensity and exposure time, etc. are dictated by the particular materials being cured in the coating. In some embodiments, partially coated spheres must be dried under ambient conditions, for example, under a stream of gas to remove solvent.

In those embodiments where the spheres were initially attached to the support surface, they may be released from the support surface (e.g., surface 429) before use. In certain embodiments, however, the coating of the spheres can occur in a partially fabricated display device, and such release may not be necessary. In those embodiments, where removal of spheres is necessary, in an operation 409 shown in FIG. 4A, the partially coated spheres are removed from the support surface. Removal can be accomplished by use of physical force, chemical treatment, or other methods. In some embodiments, the attached spheres can be removed by scraping them off the support surface with a sharp implement, such as a blade. In other embodiments, they can be pulled off the surface by e.g., applying vacuum to the surface of the spheres opposite to the support surface to which they are attached.

Mechanical force can be used to remove spheres attached to the substrate with an adhesive, a pressure gradient, or an electromagnetic force.

In those embodiments where the spheres are attached to the support surface by a pressure gradient, such as vacuum, mechanisms for applying and releasing the vacuum are needed. For example, support substrate can provide mechanisms for controlling the amount of vacuum applied to the spheres held on the support surface. In some embodiments, a controller can be used to release the vacuum when coating operations are complete.

In those embodiments where an adhesive is used to hold the spheres in fixed positions on a support surface, release of the spheres may be accomplished by chemically treating the adhesive causing it to lose its adhesive properties. For example, adhesive can be dissolved using an appropriate solvent. Typically an entire monolayer of spheres fixed on a support surface will be treated with such solvent or other chemical agent. A variety of solvent/adhesive combinations can be used for this purpose. For example, many acrylic-based adhesive materials are readily dissolved in mineral oils (e.g., white mineral oil).

It should be noted, that in certain embodiments, the spheres may not be attached to the support surface, but, for example, may reside within cells of a matrix that is designed to provide spacing between individual spheres in a monolayer. In such cases, special release techniques may be unnecessary.

After the partially coated spheres are released from the substrate in operation 409, they may be introduced into the front plane of a rotating element display. For example in those embodiments where the core sphere (uncoated or entirely coated) possesses suitable optical properties only one hemispherical coating process may be required to fabricate suitable optically and electrically anisotropic spheres. For example, spheres such as 201, 203, and 205 depicted in FIG. 2 may be fabricated using a process described above.

In certain embodiments, two different coatings may be applied to different portions of a sphere surface. For example, in order to obtain a sphere such as sphere 207 depicted in FIG. 2, one hemispherical coating should be applied to one hemisphere of the core sphere, followed by another hemispherical coating applied to the remaining uncoated hemisphere. Such process may be needed if optical properties of the core sphere are not suitable for RED applications. In other embodiments, such process may be used to create spheres with more than two dissimilar optical properties. For example, a highly specularly reflective core sphere may be 40% coated by a black coating, and then 40% coated by a white coating on the side opposite to a black coated side, thereby affording a black-and-white sphere with a specularly reflective stripe in the center. Such specially designed spheres were proposed for certain embodiments of rotating element displays.

Figure 5:
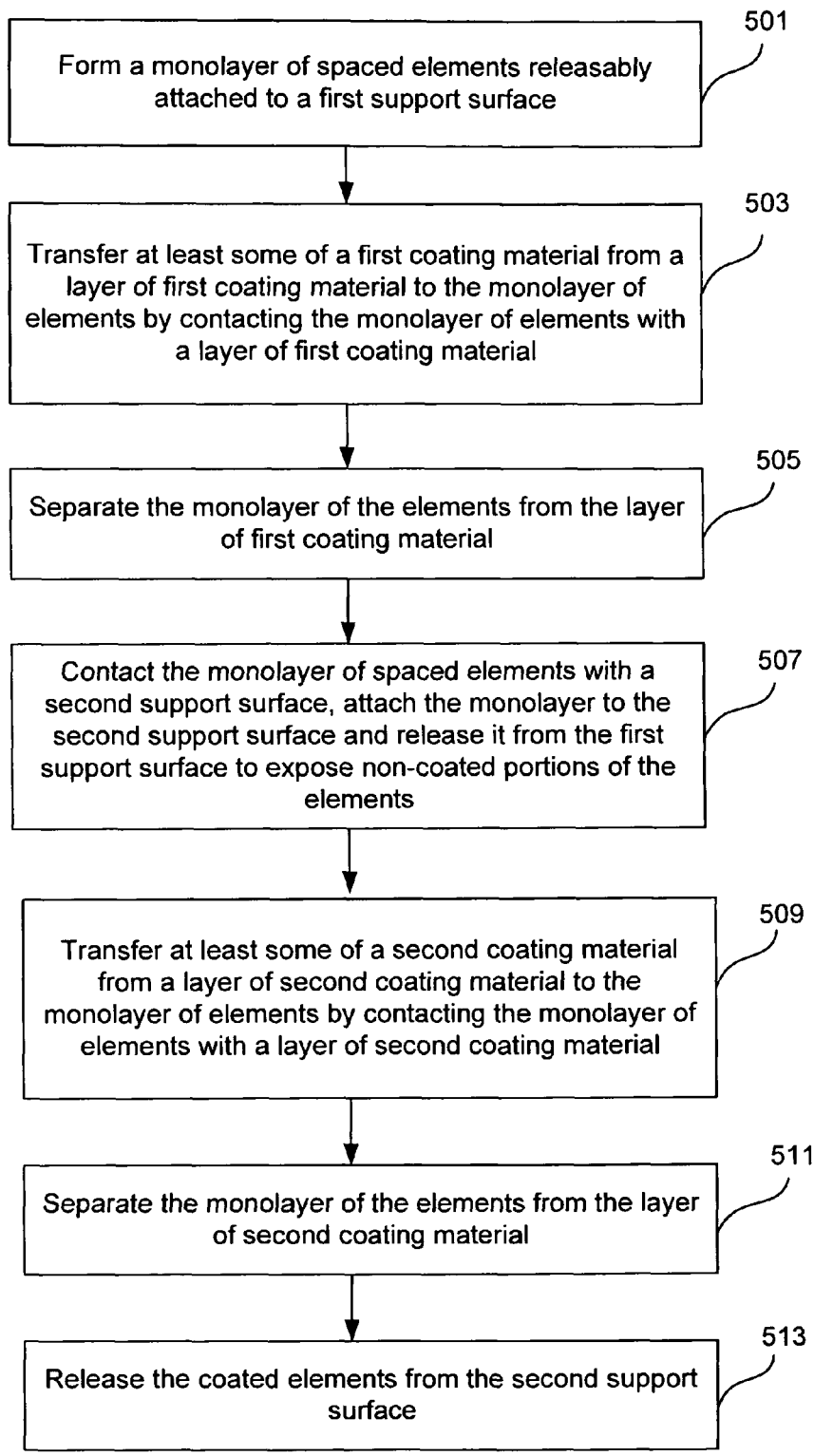
FIG. 5 is an example process flow diagram for a process of fabricating spheres having two different partial coatings.

An example process flow diagram for a method of coating spheres with two partial coatings is illustrated in FIG. 5. As in the case of forming a single partial coating, the process begins by forming a monolayer of spaced apart elements (e.g., spheres) on a support surface of a substrate, as shown in an operation 501. Preferably, the elements of a monolayer are releasably attached to the support surface. Next, in operations 503 and 505, the monolayer of spaced elements is partially coated with a coating material by a transfer coating method as described above. Optionally, the newly formed coating on the elements may be cured (not shown). The support substrate used in operation 501 is referred to as the first support substrate, and the coating material applied in operation 503 is referred to as the first coating material.

After the elements have been partially coated with the first coating material, the monolayer of spaced apart elements is releasably attached to a second support substrate surface so that, a monolayer of spaced apart elements is formed on the second substrate such that the surfaces of elements not coated by the first coating material are exposed as depicted in operation 507. This is typically accomplished by contacting a monolayer of elements formed on the first substrate with a second substrate, attaching the monolayer of elements to the second substrate, and then releasing the monolayer of elements from the first substrate. Such transfer of a monolayer can be implemented, for example, by contacting the monolayer of elements with a substrate having greater peel strength. For example, the second substrate may be more adhesive than the first substrate, or may hold on to the layer of elements by a greater pressure gradient than the first substrate or by a greater electromagnetic force. Thus upon attachment of a monolayer to the second substrate, the first substrate may be mechanically peeled off the monolayer of elements. Alternatively, even if the second substrate has a lower or comparable peel strength, it can still be used for transferring the monolayer using selectively applied release techniques. In those cases, after the monolayer of elements has been attached to the second substrate, the monolayer can be selectively released from the first substrate by any of the release methods described above, such as chemical removal of adhesive, release of vacuum, or mechanical removal, wherein each of these methods is selectively applied to the first but not to the second substrate. In general, a variety of transfer methods using different attachment forces (such as adhesion, pressure gradient or electromagnetic force) are suitable for operation 505. For example, the monolayer of elements attached to a first substrate with an adhesive can be attached to a second substrate with a vacuum, followed by peeling off the first substrate. In another example, the monolayer of elements attached to a first substrate with a vacuum force is attached to a second substrate also using a vacuum. After the monolayer has been attached to the second substrate, the vacuum between the monolayer and the first substrate surface is released, and upon removal of the first substrate, a monolayer of spaced apart elements attached to a second substrate and exposing uncoated surface is obtained.

In the following operations 509 and 513, the exposed surface of the elements is coated with a second coating material to a desired degree. The coating can proceed by transfer coating methods described above. As mentioned, the coating can be optionally cured, and the coated elements are then released from the second support surface by a suitable release method, in an operation 513. The resulting spheres with two partial (e.g., hemispherical) coatings are ready to be introduced into the front plane of a rotating element display.

Methods of Forming a Monolayer of Spaced Apart Elements

Figure 6A:
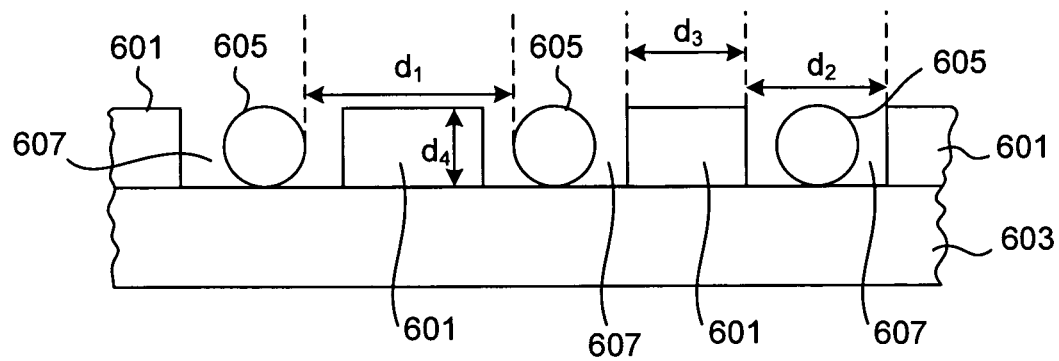
FIGS. 6A and 6B are a cross-sectional side view and a top view, respectively, of a monolayer of spaced apart spheres residing in a template matrix formed on a substrate, according to some embodiments of the present invention.
Figure 6B:
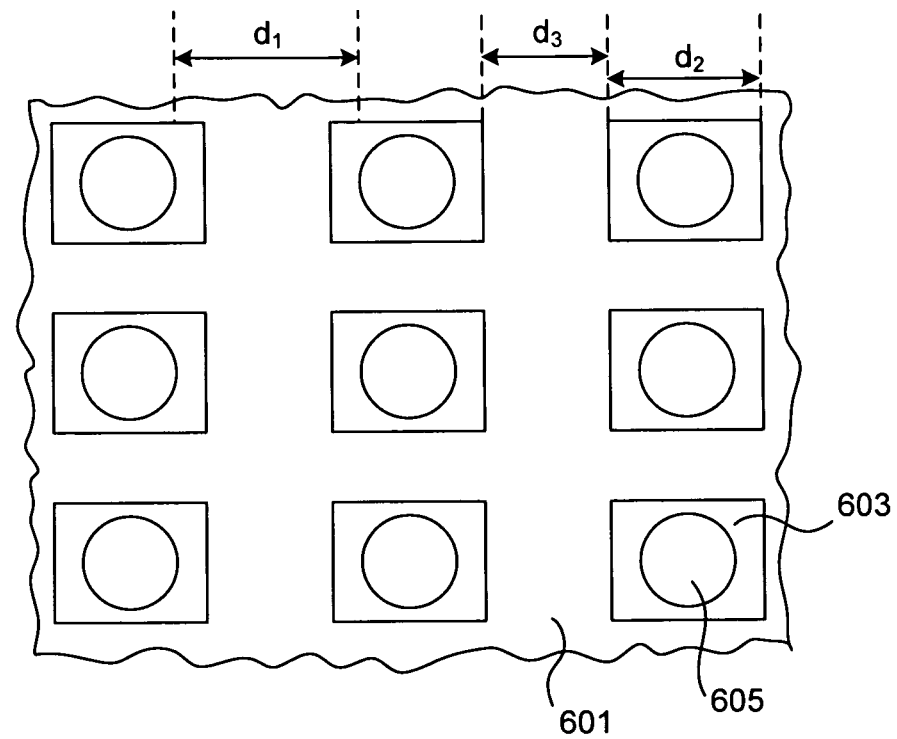

As was mentioned, in order to achieve good yields in the described transfer coating methods, it is advantageous to perform coating on a monolayer of spaced apart spheres. Several techniques for obtaining monolayers of spaced apart spheres are within the scope of this invention and some of them are herein presented. A template-based technique is illustrated in FIGS. 6A and 6B, where a cross-sectional side view and a top view, respectively, of a monolayer of spaced spheres are shown. In this embodiment, a template matrix 601 resides on top of the substrate 603. Spheres 605 reside within cells 607 of the matrix 601, with one sphere occupying each of the matrix cells. The spheres are spaced apart by a distance $d_1$. The template matrix 601 is chosen to have cells with a diameter or width $d_2$ that is greater than an average diameter of a sphere but less than two average diameters. The distance between the closest points of two neighboring cells $d_3$ in such a matrix should preferably be at least about 50% of an average diameter of the sphere.

When a matrix with such parameters is used, no more than one sphere can occupy a single cell of the matrix, and the spheres residing in the neighboring cells cannot be separated by less than 50% of an average sphere diameter. For example for a population of spheres with a diameter ranging from about 45 to 53 micrometers, the cells of a matrix may have a diameter or width $d_2$ ranging from 55 to 65 micrometers, and the actual separation between the spheres $d_1$, and preferably the minimum possible separation between the spheres (which in this case is equal to separation between the closest points of cells $d_3$) should be at least about 72 micrometers. The monolayer of spheres occupying the matrix cells is formed by dispensing the spheres onto the surface of the matrix formed on a substrate, followed by agitating the substrate and the matrix (e.g., by vibration) to fill the cells of the matrix with spheres. Excess spheres can be removed from the top of the matrix by, for example, blowing a stream of air over the matrix surface.

In some embodiments, the surface of substrate 603 is covered with a layer of adhesive. Therefore, in these embodiments the spheres 605 when dispensed onto the substrate/matrix structure will attach to the substrate having exposed portions of adhesive. In other embodiments, pressure gradient or electromagnetic forces can be used to attach spheres 605 to substrate 603. The template 601 may be permanent or temporary. Permanent template matrix will stay in place after a monolayer of spaced apart elements has been formed and will also stay in place during coating operations. A variety of permanent templates can be used, including patterned sheets of plastic or other materials. In selected embodiments, meshes made of a variety of fibers, can be used. Some examples include: a woven thermoplastic mesh (e.g., made of Nylon or PEEK) with 47 µm threads with a nominal opening of 60 µm, available from Small Parts Inc. The meshes may be made from woven stainless steel, brass, copper, nickel or other malleable metals. Such meshes are commercially available from Mcmaster-Carr and other industrials suppliers. Alternatively the meshes may also be precision manufactured with electroforming from such suppliers as InterNET.

The templates may be formed on a substrate surface using an adhesive (e.g., a plastic template or a mesh can be applied to an adhesive-covered substrate surface).

In certain embodiments, it is advantageous to use a temporary template matrix because, for example, a permanent template matrix made of mesh, when left in place during coating operations, may inadvertently transfer unwanted amount of coating material onto the spheres through wicking processes. Such undesired wicking may lead to decreased precision of hemispherical coating and generally to a decreased yield of coating process. It is, therefore, desirable to remove the template matrix before application of coating material. Several techniques can be used to remove a temporary matrix, including mechanical and chemical removal methods. Preferably, removing a temporary matrix should not displace the spheres attached to the substrate. In one example, a mesh temporary matrix can be carefully peeled off the substrate after the monolayer of spaced apart spheres is formed. In another example, a mesh template (e.g. a mesh made of certain polymeric fibers, such as polyesters or polyamides) may be chemically treated to form a soluble product, and can then be washed away with an appropriate solvent.

Temporary template matrix, such as matrix 601 illustrated in FIG. 6A can have any appropriate height $d_4$ that ensures that spheres reside within its cells in a spaced apart fashion. Temporary matrices compare favorably to permanent matrices in that the height of a matrix can vary without affecting the coating process. For example matrix height $d_4$ can be greater or smaller than the diameter of the sphere. In contrast, when permanent matrix is used, its height should preferably be smaller than the radius of the sphere to allow hemispherical transfer coating operation. In some embodiments, permanent template matrix with a height which is closely matched to an average sphere radius may be used. In these embodiments, the permanent matrix may serve essentially as a mask during transfer coating for controlling the precision of hemispherical coating.

According to one specific embodiment employing a temporary template matrix, a monolayer of spaced apart spheres is formed on a substrate by the following process. First, a mesh is applied to an adhesive-covered surface of a substrate. Next, a plurality of spheres is dispensed onto the substrate. A monolayer of spaced apart spheres is formed by vibrating the substrate, so that the spheres would fall into the mesh cells and adhere to the exposed substrate surface. Excess spheres are removed by blowing a stream of air over the substrate surface or by rolling off when exposed to continuing vibration. Finally, the mesh is carefully peeled off, affording the desired layer of spaced apart spheres releasably attached to the substrate, and ready for transfer coating operations.

Figure 6C:
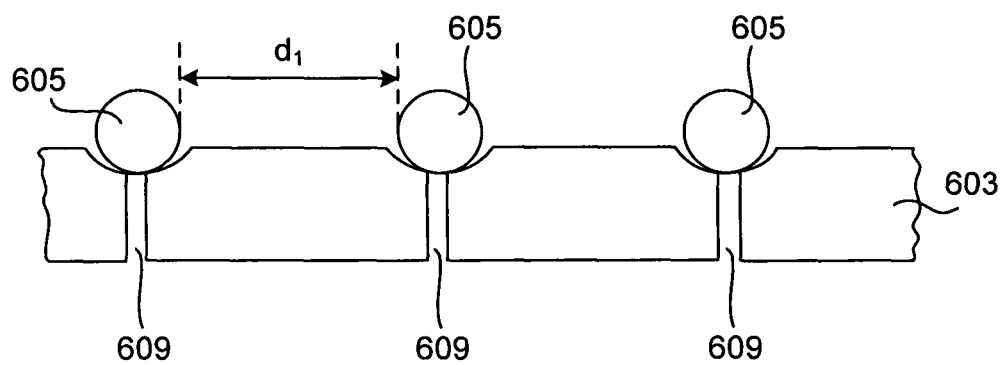
FIG. 6C is a cross-sectional side view of a monolayer of spaced apart spheres attached to a patterned substrate with a vacuum, according to some embodiments of the present invention.

In other embodiments, a monolayer of spaced apart elements can be formed without making use of a separately provided template matrix. In these embodiments, the substrate itself may be patterned in such a way as to allow formation of a desired monolayer of spaced apart spheres. For example, the substrate itself may have a pattern of recesses arranged in a spaced apart fashion that will allow the spheres occupying these recesses to form a monolayer of spaced apart spheres. In another example, the substrate may be coated with an adhesive in a special pattern, allowing spheres dispensed on top of such substrate to attach only to the portions of substrate surface covered with adhesive. A suitable pattern of adhesive will provide required dimensions for forming the monolayer of spaced apart spheres. The same result may also be obtained by providing a pattern of channels with openings at the substrate surface, such that these channels can be evacuated, and the spheres residing on top of these channels can be held in place by a pressure gradient. This embodiment is illustrated in FIG. 6C showing a cross-sectional side view of a monolayer of spaced apart spheres 605 formed on a substrate 603, by using a vacuum applied through channels 607 extending from the bottom of the substrate to its surface in a specially patterned fashion. The channels are designed in such a way, so that the distance $d_1$ between spheres attached to neighboring channels on the substrate surface is at least about 50% of an average diameter of a sphere. It should be noted, that the described patterning methods can be used either alone or in combination with each other. For example, a substrate having a pattern of recesses may have an adhesive coating or a vacuum line at the bottom of each recess.

Continuous Coating Methods

Transfer coating methods described above can be implemented on an industrial scale allowing high-throughput coating of millions or even trillions of spheres. In some embodiments, a continuous process using movable support surfaces, such as conveyer belts is employed. Typically in such a process a uniform layer of viscous coating material is formed on the surface of one conveyer belt, and a monolayer of spaced apart spheres is provided on another conveyer belt. One or both of the belts moves with respect to the other in such a way that the coating material is transferred from the layer of coating material to the monolayer of spheres. In some embodiments, movement of belts is continuous and the coating is continuously transferred during such movement. In other embodiments, the conveyer belts may move intermittently. For example, batches of spaced apart spheres can be transported to the coating transfer point by moving the belt on which the spheres reside. Then, the belt may stop, and the batch of spheres may press against the layer of coating material residing on another belt. Then both belts would move to provide a fresh layer of coating material and a new batch of uncoated spheres to the coating transfer point.

Figure 7A:
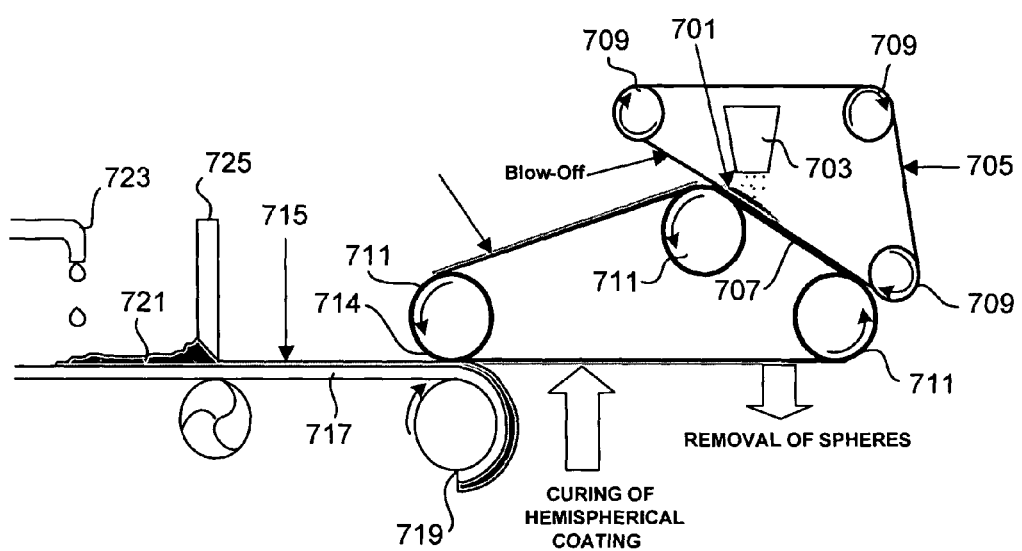
FIG. 7A is a schematic representation of one example conveyer belt configuration suitable for industrial-scale implementation of transfer coating methods described herein.
Figure 7B:
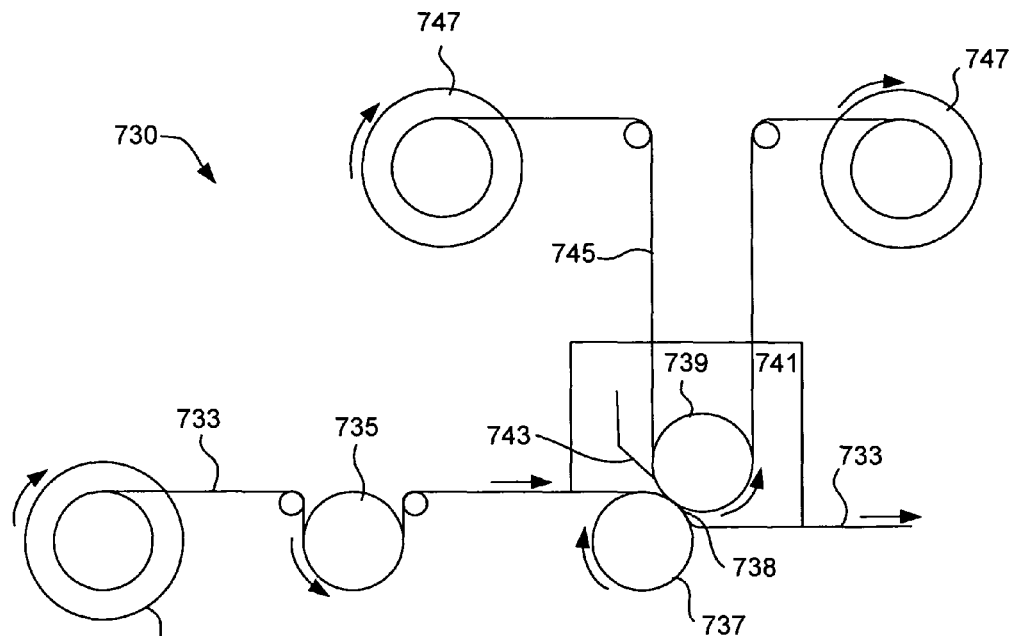
FIG. 7B is a schematic representation of another example conveyer belt configuration suitable for industrial-scale implementation of transfer coating methods described herein.
Figure 7C:
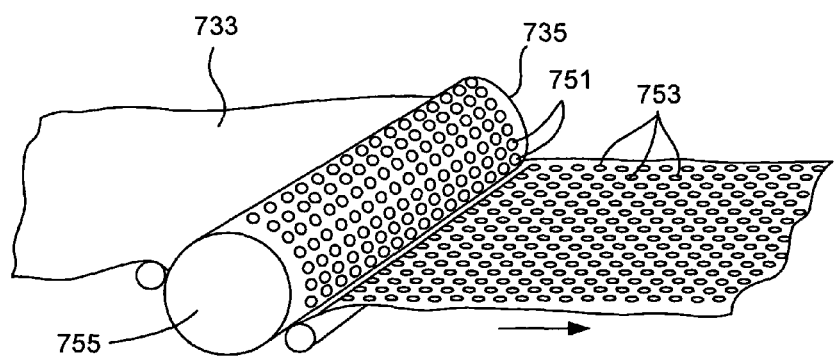
FIG. 7C is a view of a cylindrical sieve used to form a monolayer of spaced apart elements.

One example of a conveyer belt configuration that can be used to implement industrial-scale coating is shown in a schematic presentation shown in FIGS. 7A-7C. Referring to FIG. 7A, monochromal (e.g., white) spheres 701 are dispensed from a dispensing container 703 onto a mesh 705 attached to an adhesive-coated belt 707. The mesh is wrapped or formed on the cylindrical rollers 709 of first conveyer and moves in a clockwise direction. The adhesive-coated belt 707 is wrapped or formed on cylindrical rollers 711 of a second conveyer and moves in a counter-clockwise direction. After the spheres have been dispensed, they attach to the adhesive-coated belt 707 in a spaced apart pattern dictated by dimensions of the mesh template 705. Excess spheres are blown off with a stream of air. As the conveyer belts 705 and 707 move in different directions, the template mesh 705 peels off the adhesive-coated belt 707, and a monolayer of spaced apart spheres 713 formed on support surface 707 is transported in the counter-clockwise direction to the point of transfer coating 714. A uniform layer of viscous coating material 715 is formed on a conveyer belt 717 of a third conveyer and is moved in the clockwise direction by a cylindrical roller 719. The layer of coating material is formed on the belt 707 to a predetermined thickness by passing the coating material 721 dispensed from dispenser 723, through a slit formed to a predetermined thickness by a blade 725 or other member separated from belt 717 by a distance sufficient to produce a thin uniform layer of coating material.

Belts 717 and 707 move in opposite directions and come in contact at the transfer coat site 714. Typically, when one belt moves relative to another and a certain amount of pressure exists between the layer of coating material and the monolayer of spheres at the transfer coat site, the coating is transferred onto the surface of the spheres to a required amount. Upon further movement of belts 717 and 707, the partially coated spheres residing on belt 707 are separated from the layer of coating material residing on belt 717, and are moved further in the clockwise direction to the site where the coating is optionally cured, and finally to the site where the spheres are released from the belt 707, by any of the methods described above.

It is understood that the presented conveyer configuration is provided as an example, and a variety of other configurations are possible. For example, mesh need not necessarily be used as a template matrix for providing spacing between the spheres. Other template-based methods, or methods using patterned substrates as described above can be used.

FIG. 7B illustrates an example in which an industrial-scale coating process makes use of a sieve to form a monolayer of spaced apart spheres on a conveyer belt substrate. A schematic view of a conveyer belt configuration is provided in FIG. 7B. A conveyer system 730 includes a cylindrical drum 731 that rotates in a clockwise direction and delivers an adhesive-covered conveyer belt 733 to a cylindrical sieve 735. The sieve (which may include a mesh) provides evenly spaced apart openings and serves as a template for forming a monolayer of spaced apart spheres. Examples of such sieves include electroformed metal sieves or meshes, e.g., an electroformed nickel sieve. A more detailed view of the sieve 735 is shown in the FIG. 7C. The uncoated spheres are dispensed to the interior 755 of a sieve 735, pass through the openings 751 of the sieve, and adhere to the substrate conveyer belt 733. While the cylindrical sieve is moving in the counterclockwise direction, the conveyer belt is moving to the right, with the spheres being separated from the sieve and being transported with the conveyer belt. A resulting monolayer of spaced apart spheres 753 is provided into a solvent vapor containment chamber 741 where coating is applied to the spheres at a transfer coating spot 738. Coating is applied by moving a conveyer belt 733 carrying the spheres and a conveyer belt 745 carrying the layer of coating in such a manner that the layer of coating comes into contact with the layer of spheres at the coating spot 738. Such movement in this example is implemented by moving rollers 737 and 739 in the opposite directions. The conveyer belt 733 carrying the monolayer of spheres is wrapped or formed around the pinch roller 737 while the conveyer belt 745 carrying the layer of coating is wrapped or formed around the roller 739. The layer of coating is formed to a predetermined thickness using an implement 743 (e.g., a doctor blade). The conveyer belt 745 is also formed or wrapped around two cylindrical rollers 747, which move in the clockwise direction. The movement of conveyer belts is organized such that after the coating is transferred to the spheres at the transfer coating spot 738, the partially coated spheres are separated from the layer of coating and exit the solvent vapor containment chamber 741 for further processing operations.

In general, a variety of methods can be used to form monolayers of spaced apart spheres in a continuous coating process.

Figure 8:
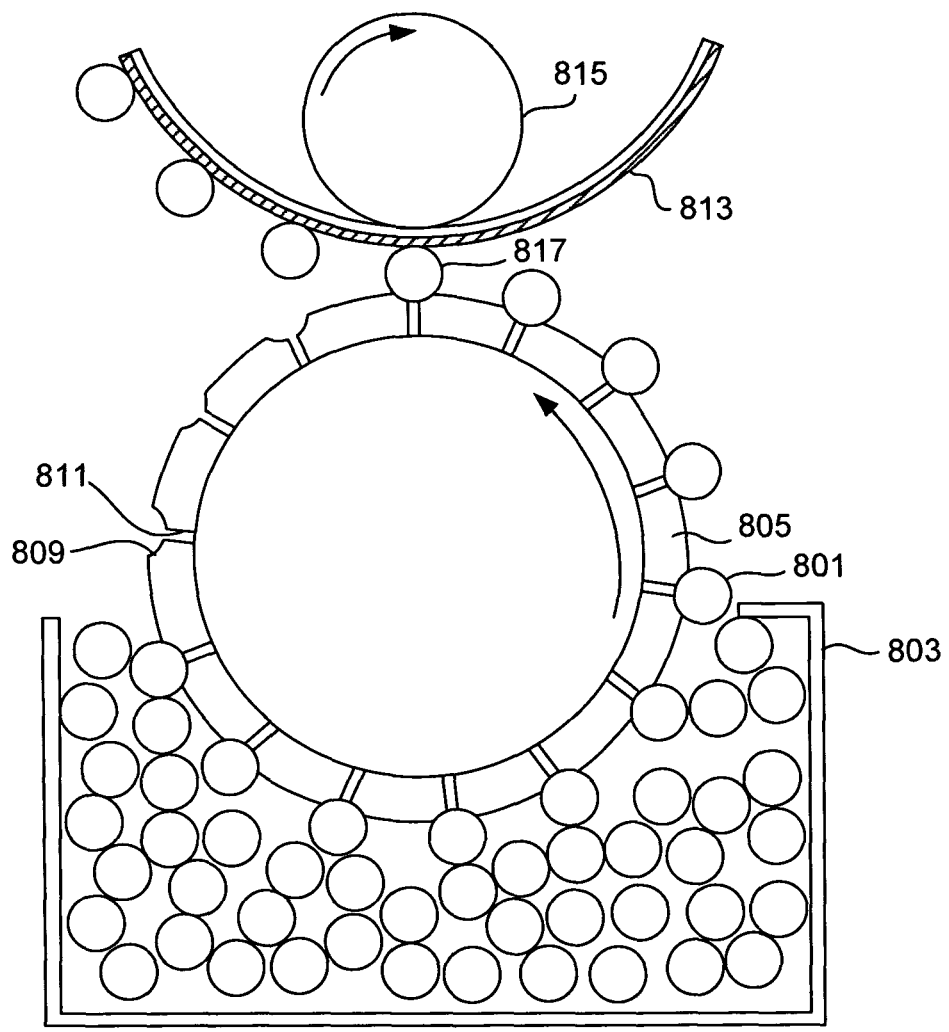
FIG. 8 is a side view of an example configuration of movable substrates suitable for generating and transferring an array of spaced apart spheres from one substrate to another, according to certain embodiments of present invention.

In one embodiment, spacing between spheres can be achieved by forming a vacuum-held array of spheres on a patterned substrate having spaced apart channels or slots. Such an array of spaced apart spheres can then be transferred to a belt having an adhesive surface to form a monolayer of appropriately spaced spheres on this belt. This implementation is illustrated in FIG. 8, showing a side view of a device suitable for producing a monolayer of spaced apart spheres. Referring to FIG. 8, spheres 801 are residing within a container 803 and are attached by a vacuum force to a patterned substrate 805, so that an array of spaced apart spheres is formed. Substrate 805 is wrapped or formed upon a cylindrical roller and moves in the counter-clockwise direction. The pattern on substrate 805 typically extends through the surface of the cylindrical substrate and comprises a plurality of spaced apart recesses 809 with a channel or a slot 811 located at the bottom of each recess. Vacuum can be applied or released at any of these channels as needed. Vacuum is applied when the spheres need to be attached to the substrate 805. After the spheres have been attached, they are transported in a counter-clockwise direction and are brought into contact with an adhesive surface of substrate 813 wrapped or formed upon a cylindrical roller 815, moving in a clockwise direction. When a sphere, such as sphere 817 comes into contact with an adhesive substrate 813 and attaches to it, the vacuum applied to this sphere is released, and upon further movement of rollers, the sphere becomes completely transferred from substrate 805 to substrate 813. Upon continued movement of substrates and continuous transfer of spheres from patterned substrate 805 to unpatterned substrate 813, a monolayer of spaced apart spheres attached to substrate 813 is obtained. According to some embodiments, substrate 813 may serve as conveyer belt 707 depicted in FIG. 7A. According to other embodiments, configuration shown in FIG. 8, may be used two implement coating of spheres with two different partial coatings. For example, a first coating may be applied to portions of exposed surface of spheres residing on substrate 805, and a second coating may be applied to uncoated portion of spheres transferred to substrate 813.

Applications

As discussed above, the transfer coating methods described herein can be used in fabrication of rotating elements for REDs. In addition, these methods can also be employed in any application that requires precision-coating of small objects or makes use of micro-scale designs and patterns. For example, elements and device features having dimensions as small as 10 micrometers can be processed by these methods.

In some embodiments, these methods can be used in biotechnological applications and in analytical chemistry applications. For example, these methods can be used to fabricate sensors for determination of chemically or biologically active compounds in a variety of assays. In one embodiment, a sensor may be fabricated by using a coating that has a chemical reactivity that is specific for a particular chemical or biological agent. The coating is hemispherically applied to a bead and the bead is contacted with the sample, where the presence or concentration of a chemically or biologically active agent is to be determined. If the active agent is present in the sample, a reaction will occur. The coating should be designed such that it produces a signal in response to such reaction. For example, a color change or a fluorescence change of the coating material may serve as such a signal. It is advantageous that the beads are only partially coated with such coating material. Such design will rule out the possibility of non-specific reactions and false-positive results, since the uncoated part of the bead serves essentially as a control during such determination.

In other embodiments, the transfer coating methods can be used in fabrication of MEMs devices. For example layers of material can be applied with precision on a micro-scale level to fabricate the MEMs structures. Those features protruding by more than a defined distance from a substrate are coated, while other (lower) features are uncoated.

In yet other embodiments, the transfer coating methods can be used in microprinting technologies. For example, printing of electronic device components, circuitboards, and integrated circuits can be performed using these methods. A specific example includes fabrication of thin film diodes and transistors, e.g., diodes and transistors having organic conductive or semiconducting layers. In one application, thin film conductive lines and devices are printed on a substrate to form a passive or active matrix backplane.

Figure 9:
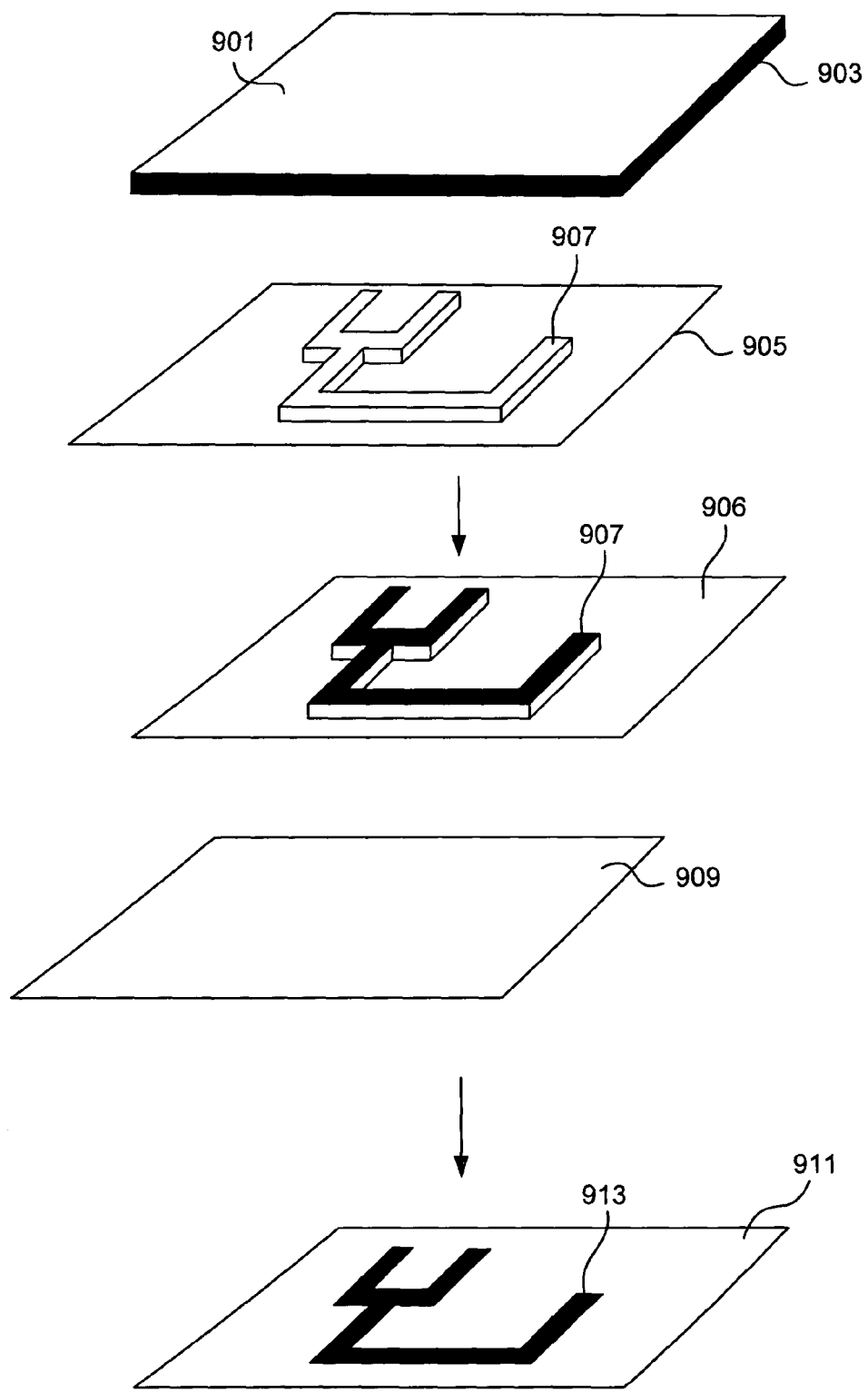
FIG. 9 is a schematic representation of process operations illustrating the use of transfer coating methods in microprinting.

Use of transfer coating methods in microprinting is illustrated in FIG. 9. In this example, a carrier 901 having a layer of coating material 903 is applied to a template substrate 905 having a printing design 907 formed on its surface. The printing design has recessed and non-recessed surfaces, and can be fabricated by, e.g., photolithographic methods. When the coating material 903 contacts the template substrate 905 it coats only the upper portion of printing design without coating the recess bottoms. The obtained partially coated printing template 906 having a coated printing design 907 is then applied to a printing medium substrate 909 to transfer the printing design. Such sequence of operation will afford a micro-scale printed design 913 on the printing medium substrate 911.

It is understood, that while the examples provided below describe only the fabrication of partially coated optically anisotropic spheres, these examples are not limiting. Coating of a variety of elements and patterns useful in a number of micro-scale applications, such as those described above, is within the scope of the described transfer coating methods.

EXAMPLES

In one example, a mesh was adhesively attached to an adhesive-coated coupon having a length of 6 inches and a width of 3 inches. Thousands of spheres were dispensed onto the coupon. The coupon was then vibrated to cause the spheres to fall into the cells of the mesh. After the spheres attached to the adhesive surface of the coupon, unattached spheres were removed by blowing a stream of air over the surface of the coupon. A monolayer of spheres with about 60000 of spheres per square inch was formed. A layer of coating material was formed to a predetermined thickness on a carrier substrate and was applied to the monolayer of spheres with a small amount of hand pressure applied to the back of the coupon. Rollers have also been employed to apply pressure. The layer of coating was then removed, and the hemispherically coated spheres were dried in air. After that the spheres were removed from the coupon substrate by a sharp implement.

Examples of spheres successfully hemispherically coated using this technique have included borosilicate glass hollow spheres with a diameter ranging from 25 to 125 µm, borosilicate glass solid spheres with a diameter ranging from 25 to 150 µm and with a diameter ranging from 100 to 650 µm, solid polymethylmethacrylate (PMMA) spheres with a diameter ranging from 20 to 150 µm, and zirconium oxide spheres with a diameter ranging from 25 to 650 µm.

The coupons included acrylic adhesive backed paper, acrylic adhesive backed PET and polyester and Natural Rubber adhesive backed paper. A variety of pressure-sensitive adhesives (PSA), such as CS9621 available from Nitto Denko, Osaka, Japan; and a number of heat-releasable adhesives, such as 3198MS, and 3198HS available from Nitto Denko, were also used. The substrates included, for example, 336 2 mil polyester tape available from 3M, and PET substrate with CS9621 adhesive available from Nitto Denko.

The mesh materials included woven nylon meshes with openings width ranging from 50 to 800 µm.

Coating material formulations included:
80% ACMI 6050 semigloss ink and 20% 13-3050 Clariant Red;
80% Loctite E-30CL and 20% FE 6331;
50% ACMI 6050 semigloss ink, 25% 13-3050 Clariant Red, 25% FE6331;
80% ACMI 6050 black, 20% 105031 Clariant Yellow; and
80% Loctite E-30CL, 19.5% FE6331, 0.5% Clariant Copy Charge N4P, wherein % refer to % by weight.
80% ACMI 6100 Clear, 15% Clariant Copy Blue PR01, 5% Cabot Mogul L
92% ACMI 6100 Yellow, 4% Clariant Copy Blue PR01, 4% Cabot Mogul L The thicknesses of transfer coating layer were 20-25 µm thickness for 45-53 µm spheres; 25-35 µm thickness for 53-63 µm spheres; 50-60 µm thickness for 90-106 µm spheres; and 250-300 µm thickness for 450-600 µm spheres.

In a particular example, 45-53 µm GL-0179 spheres organized on an acrylic adhesive backed paper coupon were coated using 22-24 µm thick layer of coating, while applying 5-10 psi of pressure. This procedure yielded an essentially hemispherical coating with 40-60% of the surface area of individual spheres being coated.

It is understood that the examples and embodiments described herein are for illustrative purposes only and that various modifications or changes in light thereof will be suggested to persons skilled in the art. Although various details have been omitted for clarity's sake, various design alternatives may be implemented. Therefore, the present examples are to be considered as illustrative and not restrictive, and the invention is not to be limited to the details given herein, but may be modified within the scope of the appended claims.

What is claimed is:

1. A method of preparing anisotropic coated elements, the method comprising:
   (a) forming a monolayer of spaced apart elements releasably attached to a support surface, the elements having a diameter or width of less than about 1 mm;
   (b) contacting the elements with a substantially uniform layer of viscous coating material to transfer at least some of the coating material from the substantially uniform layer of viscous coating material to the spaced elements on the support surface, wherein the transferred coating material does not substantially alter the shape and size of the elements and partially coats the elements; and
   (c) separating the monolayer of elements from the layer of viscous coating material used in (b).

2. The method of claim 1, wherein the elements are used in an electro-optic display.

3. The method of claim 1, wherein the elements are used in a biotechnological application.

4. The method of claim 1, wherein the coating material has chemical reactivity.

5. The method of claim 1, wherein the elements are elliptical.

6. The method of claim 1, wherein the elements are cylindrical.

7. The method of claim 1, wherein (a) comprises releasably attaching the elements to the support surface using an adhesive or a pressure gradient.

8. The method of claim 1, wherein the elements are spheres.

9. The method of claim 8, wherein the spheres have an average diameter of between about 25 and 150 micrometers.

10. The method of claim 8, wherein the spheres have an average diameter of between about 40 and 70 micrometers.

11. The method of claim 8, wherein in the monolayer of spaced spheres the minimum distance between the spheres is at least about 50% of an average sphere diameter.

12. The method of claim 8, wherein the monolayer of spaced spheres has an average distance between the spheres of at least about 30 micrometers.

13. The method of claim 8, wherein the uniform layer of viscous coating material has a thickness of about 40-60% of the diameter of the spheres that it contacts.

14. The method of claim 1, wherein contacting the elements with the substantially uniform layer of viscous coating material comprises simultaneously contacting at least about 100 elements with the substantially uniform layer of viscous coating material.

15. The method of claim 1, wherein the elements are selected from the group consisting of coated elements, uncoated elements, solid elements, hollow elements, glass elements, ceramic elements and elements made of an environmentally stable polymeric material.

16. The method of claim 1, wherein the elements provided in (a) are monochromal.

17. The method of claim 1, wherein the elements provided in (a) comprise a first color and wherein the coating material transferred to the elements in (b) provides a second color to at least a portion of the surface of the element, wherein the first color is different from the second color.

18. The method of claim 17, wherein the first color and the second color have different diffuse reflectance.

19. The method of claim 18, wherein the first and second color are black and white.

20. The method of claim 1, wherein the coating material transferred to the elements in (b) coats from about 30 to about 70% of a surface of each of the elements.

21. The method of claim 20, wherein the coating material transferred to the elements in (b) coats about 50% of the surfaces of the elements.

22. The method of claim 1, wherein forming the monolayer of spaced elements releasably attached to a support surface comprises:
   (a) providing a support substrate having an adhesive surface;
   (b) applying a template matrix having open cells to the adhesive surface of the support substrate; and
   (c) dispensing a plurality of the elements onto the template matrix attached to the support substrate to achieve spacing between elements and to achieve adhesion of elements to the support substrate, thereby forming a monolayer of the elements, wherein open cells of the matrix contain no more than one element per cell, and wherein each of the elements is adhesively attached to the support surface.

23. The method of claim 22, further comprising:
   (d) removing the template matrix from the support surface without moving the elements from their fixed positions, performed after operation (c).

24. The method of claim 22, wherein dispensing a plurality of the elements onto the template matrix attached to the support substrate to achieve spacing between elements and to achieve adhesion of elements to the support substrate comprises:
   (i) providing the elements onto the matrix attached to the support substrate;
   (ii) agitating the support substrate to fill the open cells of the matrix with the elements;
   (iii) allowing the elements within the cells to attach to the support surface; and
   (iv) removing the unattached elements.

25. The method of claim 22, wherein the template matrix comprises a mesh material.

26. The method of claim 22, wherein the open cells of the template matrix have an average diameter or width or area about 10-50% larger than a diameter or width or area of the elements.

27. The method of claim 22, wherein the elements are spheres having an average diameter in the range of about 45-53 micrometers, and wherein the template matrix is a mesh, and wherein the open cells of the mesh have an average diameter or width in the range of about 54-65 micrometers.

28. The method of claim 1, wherein providing a uniform layer of viscous coating material comprises:
   preparing the viscous coating material by mixing the coating material ingredients; and
   forming a uniform layer of viscous coating material on a carrier substrate.

29. The method of claim 1, wherein the coating material has a viscosity of about 10,000-250,000 centipoise.

30. The method of claim 29, wherein the coating material has a viscosity of about 30,000-250,000 centipoise.

31. The method of claim 1, wherein operations (a)-(c) result in formation of partially coated elements having a nonuniform charge distribution.

32. The method of claim 1, wherein the uniform layer of viscous coating material has a thickness of about 25-30 micrometers.

33. The method of claim 1, wherein (b) comprises applying pressure to the layer of coating material contacting the layer of spaced elements or applying pressure to the layer of spaced elements contacting the layer of coating material.

34. The method of claim 1, further comprising curing the coated elements obtained after operation (c) by a UV or thermal treatment.

35. The method of claim 1, wherein the coating material comprises a pigment and a binder.

36. The method of claim 35, wherein the coating material comprises between about 20-50% of pigment by weight and between about 50-80% of binder by weight.

37. The method of claim 35, wherein the coating material comprises between about 1-20% of pigment by weight and between about 80-99% of binder by weight.

38. The method of claim 35, wherein the coating material further comprises charge control agent.

39. The method of claim 38, wherein the charge control agent is present in a concentration of between about 0.01-5% by weight.

40. The method of claim 35, wherein the pigment is capable of enhancing a charge of the coating material.

41. The method of claim 1, wherein the method further comprises removing the monolayer of elements from the support surface after operation (c).

42. The method of claim 41, wherein removing the monolayer of elements from the support surface is performed by scraping the elements off the support substrate or by dissolving an adhesive to release the elements from the support substrate.

43. A method of preparing optically anisotropic elements for an electro-optic display, the method comprising:
(a) forming a monolayer of spaced apart elements releasably attached to a support surface, the elements having a diameter or width of less than about 1 mm;
(b) contacting the elements with a substantially uniform layer of viscous coating material to transfer at least some of the coating material from the substantially uniform layer of coating material to the spaced elements on the support surface, wherein the transferred coating material does not substantially alter the shape and size of the elements and partially coats the elements; and
(c) separating the monolayer of elements from the layer of viscous coating material used in (b).

44. A method of preparing optically anisotropic elements, the method comprising:
(a) forming a monolayer of spaced elements releasably attached to a first support surface;
(b) providing a uniform layer of first viscous coating material;
(c) transferring at least some of the first coating material from the uniform layer of first viscous coating material to the spaced elements releasably attached to the first support surface, by contacting said elements with said uniform layer of first viscous coating material;
(d) removing the monolayer of spaced elements from the layer of first viscous coating material used in (c) without releasing the monolayer of spaced elements from the first support surface;
(e) contacting the monolayer of spaced elements releasably attached to the first support surface with a second support surface;
(f) releasably attaching the monolayer of spaced elements to the second support surface;
(g) selectively releasing the monolayer of spaced elements from the first support surface to form a monolayer of spaced elements attached to the second support surface, wherein the elements of the monolayer expose a surface not coated by the first viscous coating material;
(h) providing a uniform layer of second viscous coating material;
(i) transferring at least some of the second viscous coating material from the uniform layer of second viscous coating material to the spaced elements releasably attached to the second support surface, by contacting said elements with said uniform layer of second viscous coating material, whereby the second viscous coating material coats at least a portion of exposed surface of the elements;
(j) removing the monolayer of spaced elements from the layer of second viscous coating material used in (i);
(k) releasing the monolayer of spaced elements from the second support surface.

45. A method of preparing optically anisotropic elements for an electro-optic display, the method comprising:
releasably attaching display elements to a first substrate to form a monolayer of the display elements on the first substrate, wherein the display elements are spaced apart from one another in the monolayer;
coating exposed surfaces of the display elements with a first coating material while the display elements are attached to the first substrate;
releasing the monolayer of the display elements from the first substrate and releasably attaching the display elements to a second substrate to form a second monolayer of spaced apart elements, wherein the elements of the second monolayer expose surfaces not coated by the first coating material; and
coating the uncoated surfaces of the display elements with a second coating material.

46. A method of preparing anisotropic coated elements, the method comprising:
(a) forming a monolayer of spaced elements releasably attached to a support surface; the elements having a diameter or width of less than about 1 mm;
(b) providing a substantially uniform layer of viscous coating material formed on a substrate surface, wherein the substantially uniform layer of coating material can be formed and provided continuously;
(c) moving the support surface with respect to the substrate surface to transfer at least some of the coating material from the substantially uniform layer of coating material to the spaced elements a releasably attached to the support surface, wherein the transferred coating material does not substantially alter the shape and size of the elements and partially coats the elements;
(d) removing the monolayer of spaced elements from the layer of viscous coating material, wherein the elements are partially coated with the coating material; and
(e) removing the monolayer of elements from the support surface.

47. The method of claim 46, wherein the substrate surface is a conveyer belt or is connected with a conveyer belt.

48. The method of claim 46, wherein the support surface is movable, and wherein forming the monolayer of elements on the support surface can be performed continuously by moving the support surface.

49. The method of claim 46, wherein the support surface is a conveyer belt or is connected with a conveyer belt.

* * * * *